US012114087B2

(12) United States Patent
Fujii

(10) Patent No.: US 12,114,087 B2
(45) Date of Patent: Oct. 8, 2024

(54) IMAGING APPARATUS AND IMAGING METHOD FOR PERFORMING FIRST AND SECOND READOUTS DURING A VERTICAL PERIOD

(71) Applicant: Sony Group Corporation, Tokyo (JP)

(72) Inventor: Shinichi Fujii, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 147 days.

(21) Appl. No.: 17/926,311

(22) PCT Filed: Apr. 6, 2021

(86) PCT No.: PCT/JP2021/014668
§ 371 (c)(1),
(2) Date: Nov. 18, 2022

(87) PCT Pub. No.: WO2021/241014
PCT Pub. Date: Dec. 2, 2021

(65) Prior Publication Data
US 2023/0217126 A1    Jul. 6, 2023

(30) Foreign Application Priority Data

May 25, 2020   (JP) .................................. 2020-090342

(51) Int. Cl.
*H04N 25/704*   (2023.01)
*H04N 23/67*   (2023.01)
(Continued)

(52) U.S. Cl.
CPC ......... *H04N 25/704* (2023.01); *H04N 23/672* (2023.01); *H04N 25/7795* (2023.01); *H04N 25/78* (2023.01)

(58) Field of Classification Search
CPC ............... H04N 25/704; H04N 23/672; H04N 25/7795; H04N 25/78
See application file for complete search history.

(56) References Cited

U.S. PATENT DOCUMENTS 9,462,237 B2* 10/2016 Koshiba ............... H04N 25/585
11,310,410 B2* 4/2022 Sakato ................. H04N 23/672
(Continued)

FOREIGN PATENT DOCUMENTS

CN   105100650 A   11/2015
CN   107690805 A   2/2018
(Continued)

OTHER PUBLICATIONS

International Search Report (PCT/ISA/210), International Application No. PCT/JP2021/014668, dated Jul. 13, 2021.

*Primary Examiner* — Nicholas G Giles
(74) *Attorney, Agent, or Firm* — Michael Best & Friedrich LLP

(57) ABSTRACT

An imaging apparatus includes an imaging element including photodiode divided pixels, and a control unit. The control unit performs control to execute first readout in which an addition value of a first pixel and a second pixel constituting a photodiode divided pixel is read out as a pixel value constituting an image and second readout of performing readout in which a value of the first pixel and a value of the second pixel used for phase difference detection can be obtained from a photodiode divided pixel that is not a readout target in the first readout. In this case, the first readout is performed after performing the second readout in one vertical period.

12 Claims, 18 Drawing Sheets

(51) Int. Cl.
    *H04N 25/76*     (2023.01)
    *H04N 25/78*     (2023.01)

(56) References Cited

U.S. PATENT DOCUMENTS

| | | | |
|---|---|---|---|
| 2015/0319412 A1* | 11/2015 | Koshiba | H04N 25/134 348/246 |
| 2015/0341580 A1 | 11/2015 | Yamazaki | |
| 2016/0337578 A1 | 11/2016 | Kikuchi | |
| 2018/0077337 A1 | 3/2018 | Fujii | |
| 2019/0041604 A1 | 2/2019 | Tanaka | |
| 2019/0082131 A1 | 3/2019 | Hatakeyama | |
| 2019/0182431 A1 | 6/2019 | Kikuchi | |
| 2019/0268544 A1 | 8/2019 | Okubo | |
| 2020/0195855 A1* | 6/2020 | Sakato | G03B 13/32 |

FOREIGN PATENT DOCUMENTS

| | | |
|---|---|---|
| CN | 109474781 A | 3/2019 |
| EP | 3269134 A1 | 1/2018 |
| JP | 2015222885 A | 12/2015 |
| JP | 2017005443 A | 1/2017 |
| JP | 2018081224 A | 5/2018 |
| JP | 2019050486 A | 3/2019 |
| KR | 20180016373 A | 2/2018 |

* cited by examiner

ATTACHED TO

FIG. 13
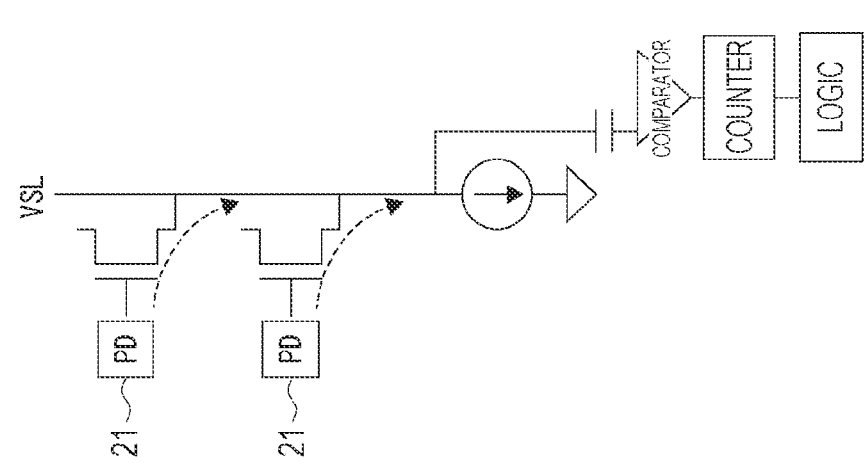
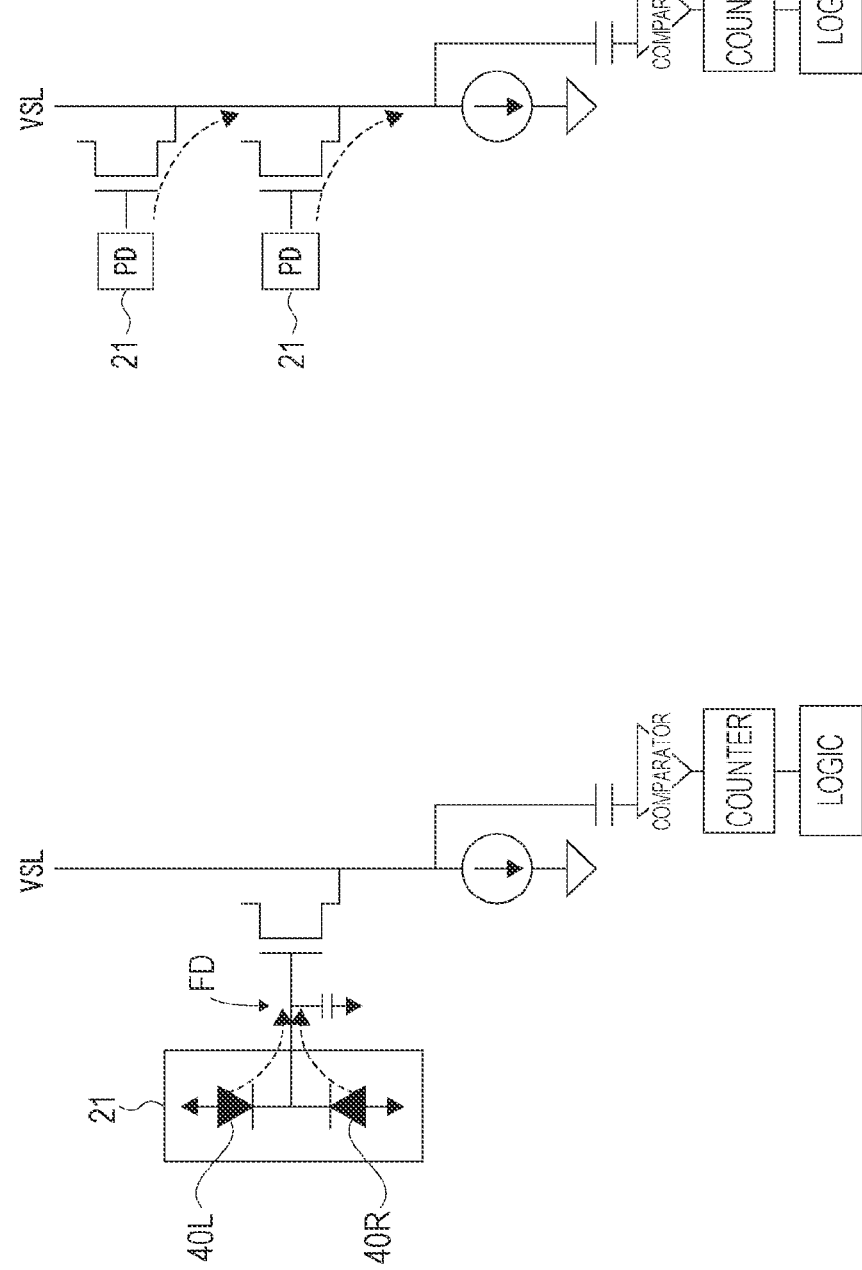

IMAGING APPARATUS AND IMAGING METHOD FOR PERFORMING FIRST AND SECOND READOUTS DURING A VERTICAL PERIOD

TECHNICAL FIELD

The present technology relates to an imaging apparatus and an imaging method that include an imaging element including a pixel group that outputs a phase difference signal.

BACKGROUND ART

Some imaging apparatuses have a function of acquiring focus information concerning a subject in order to perform autofocus control. As such an imaging apparatus, for example, an imaging apparatus including pixels for detecting a focal point is known.

Patent Document 1 discloses a technique of reading out a plurality of image signals that is pupil-divided by an imaging element to perform focal point detection, and controlling a readout row that acquires a plurality of image signals to change the readout row of focal point detection pixels according to an accumulation time or a sensitivity setting of the imaging element.

CITATION LIST

Patent Document

Patent Document 1: Japanese Patent Application Laid-Open No. 2018-81224

SUMMARY OF THE INVENTION

Problems to be Solved by the Invention

By the way, a plurality of image signals (pixel values) that is pupil-divided can be read out by pixels according to a photodiode (PD) division system, and in order to read out the image signals, it is known to perform readout of one pixel divided with respect to some of PD divided pixels while reading out addition values of two pixels of PD divided pixels that are divided as normal pixel readout for generating image signals. By reading out the addition value and one pixel, the other pixel value can also be calculated, and phase difference detection can be performed with pixel values of one pixel and the other pixel.

In a case where such readout is performed during one vertical period (also written as "1V"), and AF control is performed by phase difference detection, there is a case where a response delay by which the AF operation cannot be reflected in a next vertical period occurs.

Therefore, in the present technology, a readout operation of the imaging element including PD divided pixels is devised so as not to lower the responsiveness of the AF operation.

Solutions to Problems

An imaging apparatus according to the present technology includes: an imaging element including photodiode divided pixels; and a control unit that performs control to perform, with respect to first readout in which an addition value of a first pixel and a second pixel constituting the photodiode divided pixel is read out as a pixel value constituting an image and second readout of performing readout in which a value of the first pixel and a value of the second pixel used for phase difference detection can be obtained from the photodiode divided pixel that is not a readout target in the first readout, the first readout after performing the second readout in one vertical period.

The photodiode divided pixel (PD divided pixel) becomes a pixel used for image generation by reading out the addition value of the first pixel and the second pixel. For phase difference detection, readout for obtaining each value of the first pixel and the second pixel is performed. In this case, the second readout for the phase difference detection is performed prior to the first readout in which the addition value is read out.

Note that the vertical period is a period defined by a vertical synchronization signal, and one frame period of an image.

In the above-described imaging apparatus according to the present technology, it is conceivable that the control unit performs the second readout and the first readout as readout in the one vertical period in a case where an environment is determined as a bright environment by bright/dark determination.

Due to automatic exposure control including shutter speed control, the frame rate increases at the time of imaging in a bright environment, and the frame rate decreases at the time of imaging in a dark environment. The second readout is performed prior to the first readout in a state where the frame rate is high.

In the above-described imaging apparatus according to the present technology, it is conceivable that, in a case where the environment is determined as a dark environment by the bright/dark determination, the control unit performs control to perform third readout in which, with respect to a pixel that is an image generation target, the pixel value constituting the image and the value of the first pixel and the value of the second pixel used for the phase difference detection can be obtained by reading out the addition value of the first pixel and the second pixel and reading out one value out of the first pixel and the second pixel, as readout in the one vertical period.

At the time of imaging in a dark environment where the frame rate decreases, instead of readout in which the second readout is performed prior to the first readout, a readout operation in which both the pixel value and the values for the phase difference detection are read out is performed as third readout.

In the above-described imaging apparatus according to the present technology, it is conceivable that, in the third readout, the one value out of the first pixel and the second pixel and the addition value are read out by adding values of a plurality of photodiode divided pixels in a vertical direction.

In a dark environment, the readout of the pixel value is read out as a value obtained by vertical addition in response to a decrease in the value of the pixel due to a decrease in the exposure amount.

In the above-described imaging apparatus according to the present technology, it is conceivable that, in the first readout, addition values of the first pixels and the second pixels of the PD divided pixels in (N−1) or less horizontal lines are added in a vertical direction and read out in a cycle of N (N being a natural number of three or more) horizontal lines, and in the second readout, readout is performed in which the value of the first pixel and the value of the second pixel can be obtained from the PD divided pixel in a horizontal line for which readout is not performed in the first readout.

In the first readout, readout is performed for (N−1) horizontal lines in a cycle of N horizontal lines instead of reading out all the horizontal lines. That is, thinning-out readout is performed.

In the above-described imaging apparatus according to the present technology, it is conceivable that a value of N as a cycle of the horizontal lines is changed according to brightness.

In the first readout and the second readout, image generation and phase difference detection are performed from the values of the pixels obtained by thinning-out readout, but the thinning-out rate can be changed according to the lightness condition.

In the above-described imaging apparatus according to the present technology, it is conceivable that in the second readout, readout of the addition value of the first pixel and the second pixel and readout of one value out of the first pixel and the second pixel are performed.

By reading out the addition value of the first pixel and the second pixel and the value of one pixel, the value of the other pixel can also be calculated, and each of the value of the first pixel and the value of the second pixel can be obtained.

In the above-described imaging apparatus according to the present technology, it is conceivable that the addition value obtained by the first readout is used for generating a live view image.

The pixel value read out as the addition value of the first pixel and the second pixel is used for a live view image (an image for an imaging monitor, also referred to as a through image) that is an image having a relatively low resolution.

In the above-described imaging apparatus according to the present technology, it is conceivable that the imaging element includes light shielding pixels that have a pupil division function by including: a light shielding unit that shields one beam of light of a pair of beams of light that has passed through a pair of partial regions, the partial regions being deviated in directions opposite to each other in a predetermined direction at an exit pupil; and a light receiving element that receives another beam of light, the control unit performs control to perform fourth readout in which the light shielding pixels are read out, and phase difference detection processing is performed by using values of the light shielding pixels obtained in the fourth readout.

The light shielding pixel is, for example, either one of a pixel on which only light that has passed through the left side region that is a left half region of the exit pupil is incident due to the light shielding unit or a pixel on which only light that has passed through the right side region that is a right half region of the exit pupil is incident due to the light shielding unit.

In the above-described imaging apparatus according to the present technology, it is conceivable that the fourth readout is performed prior to the second readout as readout in the one vertical period.

The readout of the light shielding pixels as the fourth readout and the second readout are performed before and after in a time dividing manner.

In the above-described imaging apparatus according to the present technology, it is conceivable that focus control is performed by using a result with higher reliability out of a result of the phase difference detection processing based on the second readout and a result of the phase difference detection processing based on the fourth readout.

The focus control is performed by selectively using either one of a defocus amount calculated as a phase difference detection result from the light shielding pixels or a defocus amount calculated as a phase difference detection result from the photodiode divided pixels.

An imaging method according to the present technology includes, as an imaging method of an imaging apparatus that includes an imaging element including photodiode divided pixels, performing control to perform, with respect to first readout in which an addition value of a first pixel and a second pixel constituting the photodiode divided pixel is read out as a pixel value constituting an image and second readout of performing readout in which a value of the first pixel and a value of the second pixel used for phase difference detection can be obtained from the photodiode divided pixel that is not a readout target in the first readout, the first readout after performing the second readout in one vertical period.

Therefore, an imaging apparatus is realized in which the first readout and the second readout are performed in a time dividing manner, and the second readout is performed first.

BRIEF DESCRIPTION OF DRAWINGS

FIG. 13 is an explanatory view of FD addition and SF addition according to the embodiment.

MODE FOR CARRYING OUT THE INVENTION

Hereinafter, embodiments will be described in the following order with reference to the accompanying drawings.

<1. Configuration of imaging apparatus>
<2. Readout operation according to comparative example>
<3. Readout operation according to first embodiment>
<4. Readout operation according to second embodiment>
<5. Summary and modifications>

<1. Configuration of Imaging Apparatus>

Figure 1:
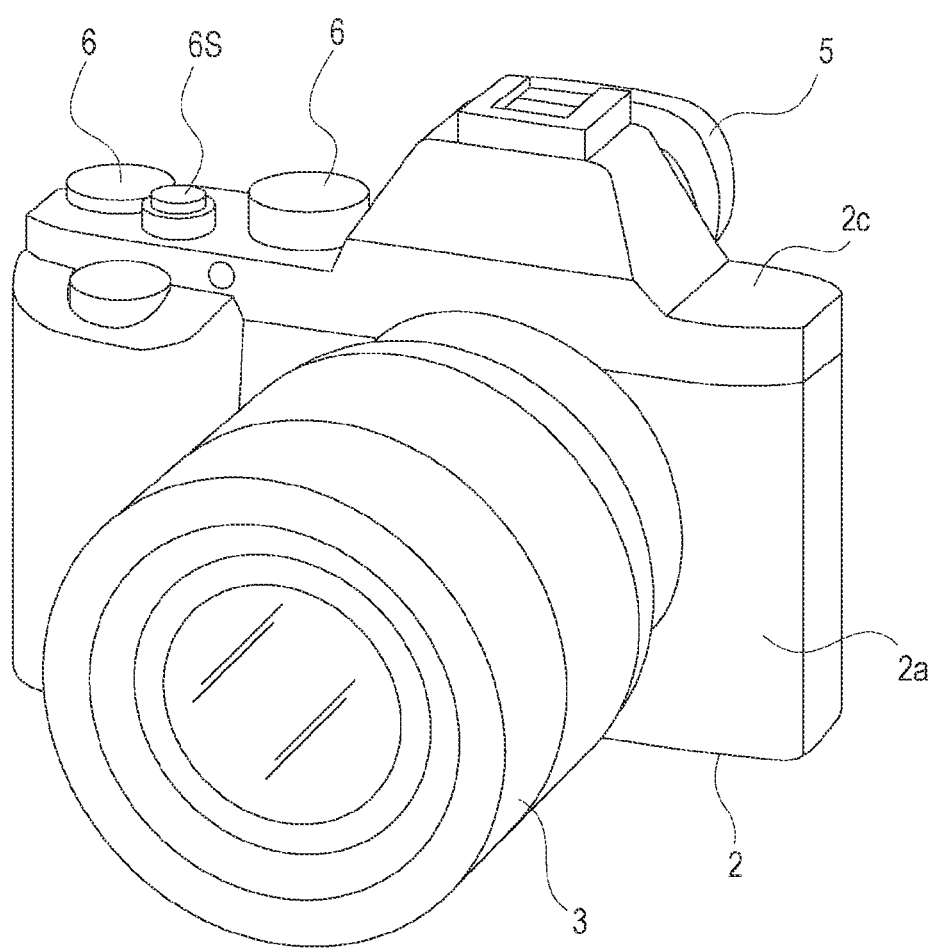
FIG. 1 is a perspective view of an imaging apparatus according to an embodiment of the present technology.
Figure 2:
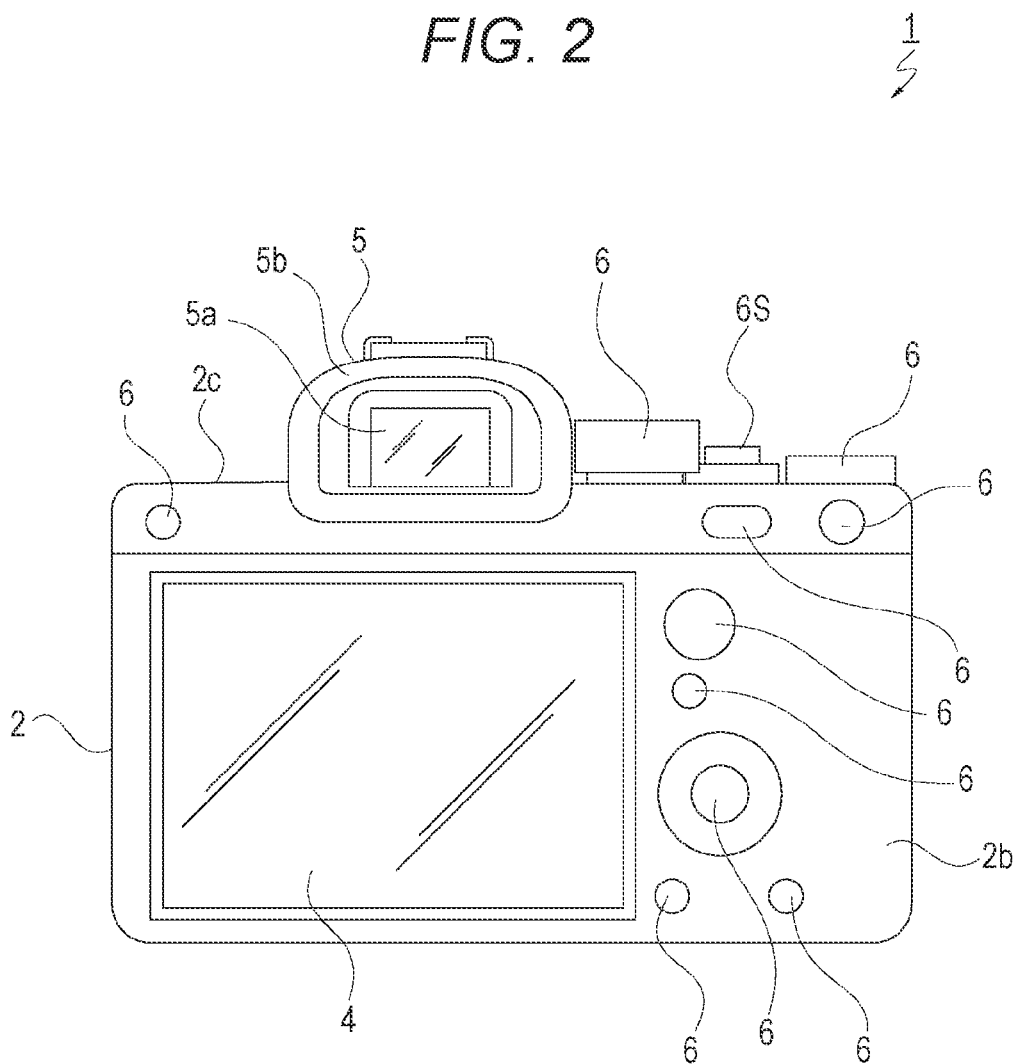
FIG. 2 is a rear view of the imaging apparatus according to the embodiment.

An external appearance of an imaging apparatus 1 according to the present embodiment is illustrated in FIGS. 1, 2.

Note that, in each of the following examples, description will be made with a subject side as a front and an imaging person side as a rear, but these directions are for convenience of description, and the implementation of the present technology is not limited to these directions.

As illustrated in FIGS. 1 and 2, the imaging apparatus 1 includes a camera housing 2 in which necessary units are each arranged inside or outside thereof, and a lens barrel 3 that is attachable to and detachable from the camera housing 2 and is attached to a front surface portion 2a. Note that the lens barrel 3 is attachable and detachable as a so-called interchangeable lens by way of example, and may be a lens barrel that cannot be detached from the camera housing 2.

A rear monitor 4 is arranged on a rear surface portion 2b of the camera housing 2. A live view image, a reproduced image of a recorded image, and the like are displayed on the rear monitor 4.

The rear monitor 4 is, for example, a display device such as a liquid crystal display (LCD) or an organic electro-luminescence (EL) display.

The rear monitor 4 is rotatable with respect to the camera housing 2. For example, the rear monitor 4 is rotatable such that a lower end portion thereof moves rearward using an upper end portion thereof as a rotation axis.

Note that a right end portion or a left end portion of the rear monitor 4 may be used as the rotation axis. Moreover, it may be rotatable in a plurality of directions around axes.

An electric viewfinder (EVF) 5 is arranged on an upper surface portion 2c of the camera housing 2. The EVF 5 includes an EVF monitor 5a and a surrounding portion 5b that protrudes rearward in a frame shape so as to surround an upper side and left and right sides of the EVF monitor 5a.

The EVF monitor 5a is formed using an LCD, an organic EL display, or the like. Note that an optical view finder (OVF) may be provided instead of the EVF monitor 5a.

Various manipulation elements 6 are provided on the rear surface portion 2b and the upper surface portion 2c. The manipulation elements 6 are, for example, a reproduction menu start button, a decision button, a cross key, a cancellation button, a zoom key, a slide key, a shutter button 6S (release button), and the like.

The various manipulation elements 6 include elements in various modes such as a button, a dial, and a composite manipulation element that can be pressed or rotated. With the manipulation elements 6 in various modes, a menu manipulation, a reproduction manipulation, mode selection/switching manipulations, a focus manipulation, a zoom manipulation, selection/setting of parameters such as shutter speed, F value, and the like can be performed, for example.

Figure 3:
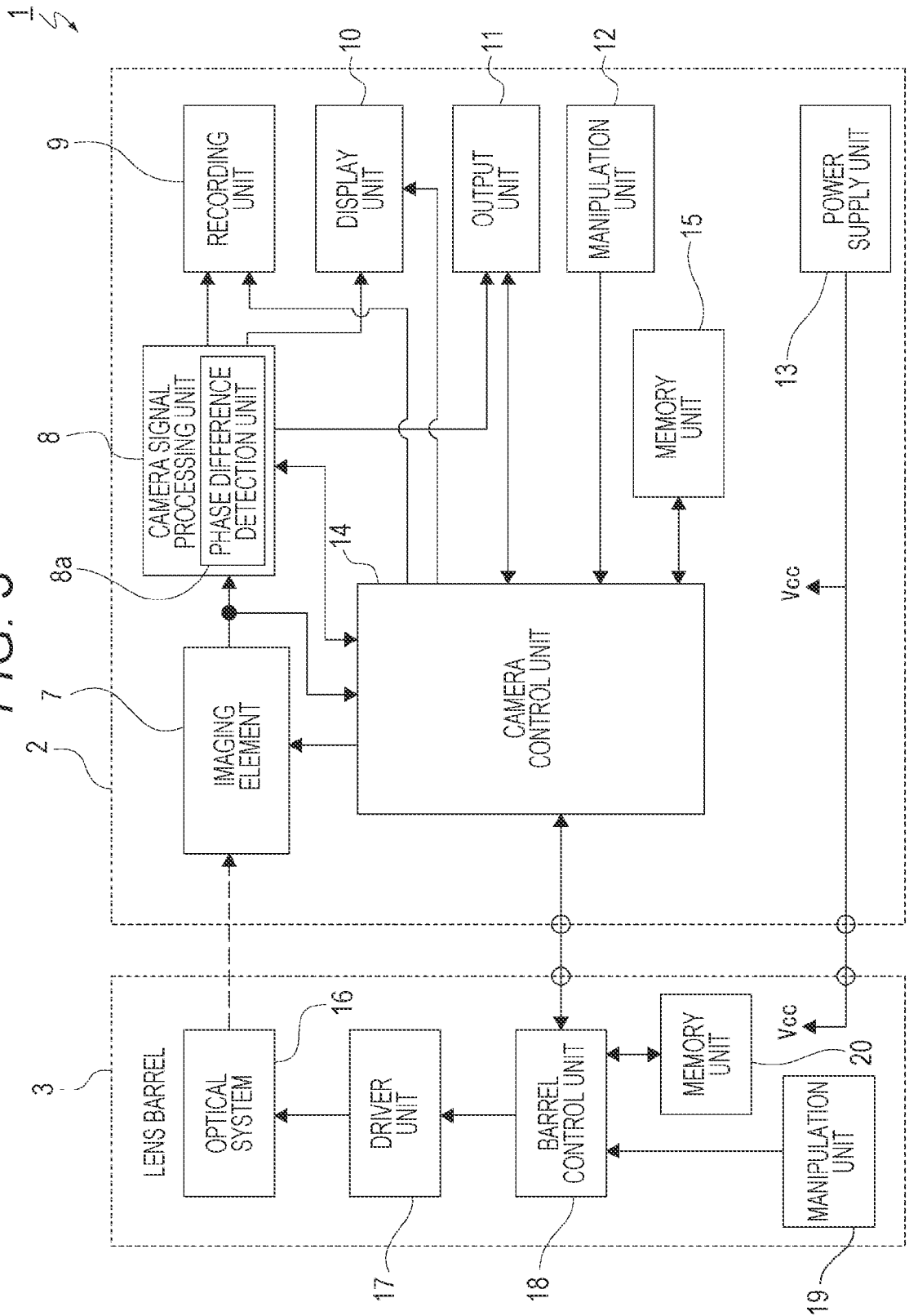
FIG. 3 is a block diagram of a configuration of the imaging apparatus according to the embodiment.
Figure 4:
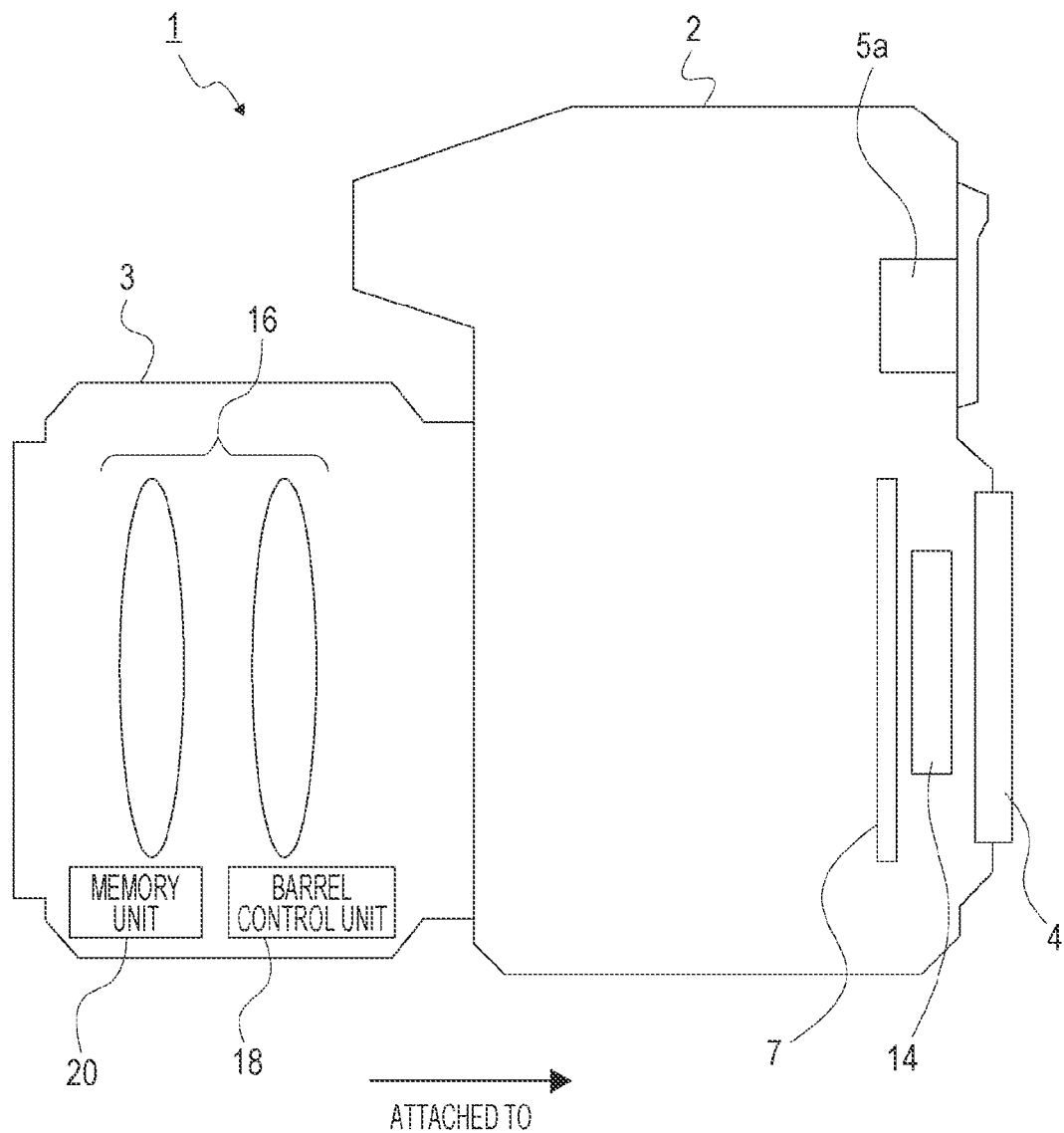
FIG. 4 is an explanatory view of a configuration in a lens barrel of the imaging apparatus according to the embodiment.

FIG. 3 illustrates an internal configuration of such an imaging apparatus 1. Furthermore, FIG. 4 illustrates an arrangement example of a part of the configuration in FIG. 3.

An imaging element 7, a camera signal processing unit 8, a recording unit 9, a display unit 10, an output unit 11, a manipulation unit 12, a power supply unit 13, a camera control unit 14, a memory unit 15, and the like are provided inside or outside the camera housing 2 of the imaging apparatus 1.

The lens barrel 3 includes an optical system 16, a driver unit 17, a barrel control unit 18, a manipulation unit 19, a memory unit 20, and the like.

The optical system 16 includes various lenses such as an incidence end lens, a zoom lens, a focus lens, and a condenser lens, an aperture mechanism that performs exposure control by adjusting an opening amount by a lens or an iris (aperture) such that sensing is performed in a state where a signal charge falls within a dynamic range without being saturated, and a shutter unit such as a focal plane shutter.

Note that a part of each unit constituting the optical system 16 may be provided in the camera housing 2.

The imaging element 7 is, for example, of a charge coupled device (CCD) type or a complementary metal-oxide semiconductor (CMOS) type, and performs exposure control of light, from a subject, incident through the optical system 16. In addition, the imaging element 7 includes a processing unit that performs, for example, correlated double sampling (CDS) processing, automatic gain control (AGC) processing, and analog/digital (A/D) conversion processing with respect to an electric signal that has been photoelectrically converted by a pixel. Therefore, the imaging element 7 outputs imaged image signals as digital data to the camera signal processing unit 8 and the camera control unit 14.

A sensor surface of the imaging element 7 includes a sensing element in which a plurality of pixels is two-dimensionally arranged.

Figure 5:
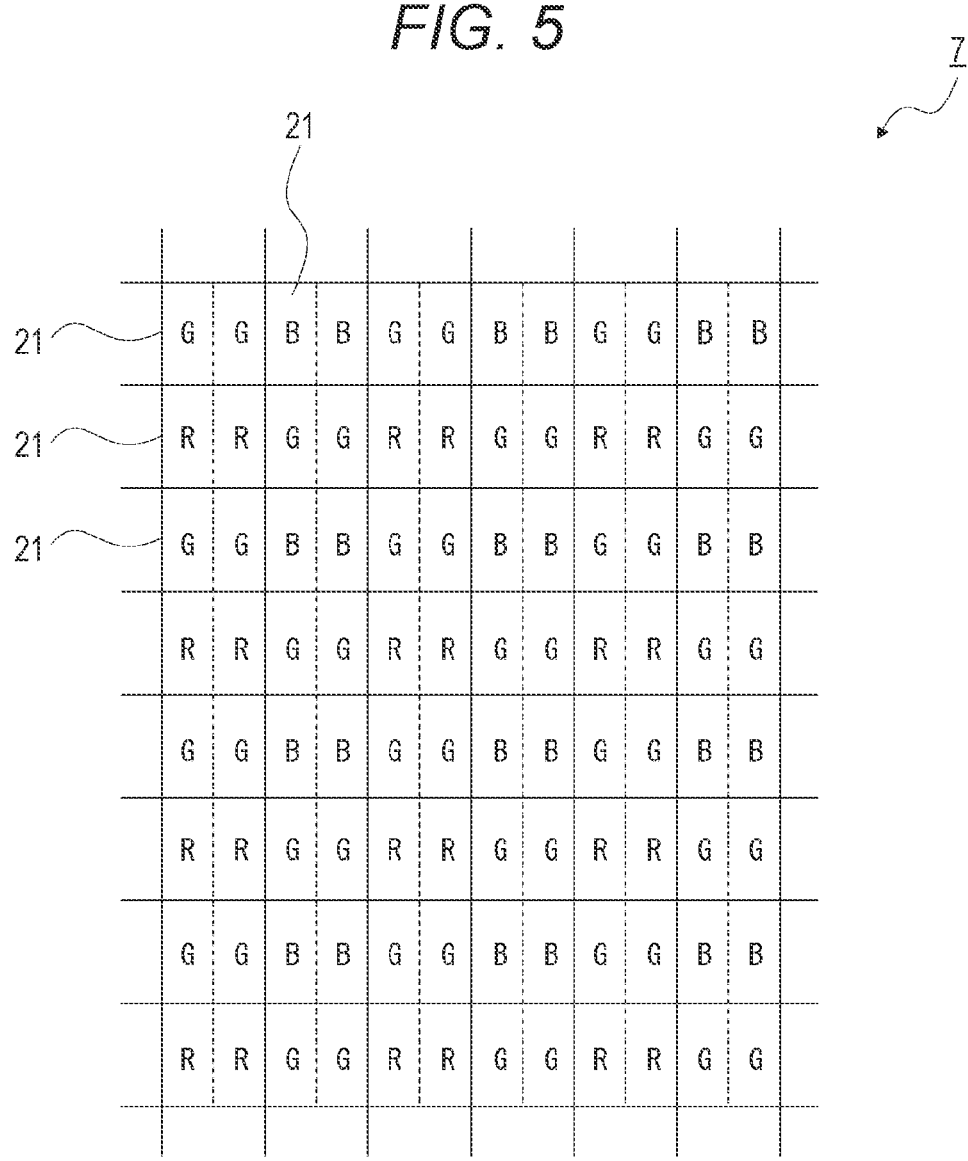
FIG. 5 is an explanatory view of an imaging element including PD divided pixels, according to the embodiment.

As illustrated in FIG. 5, the imaging element 7 is formed by arranging PD divided pixels 21 in a matrix in row and column directions. Each PD divided pixel 21 includes two divided pixels.

Figure 6:
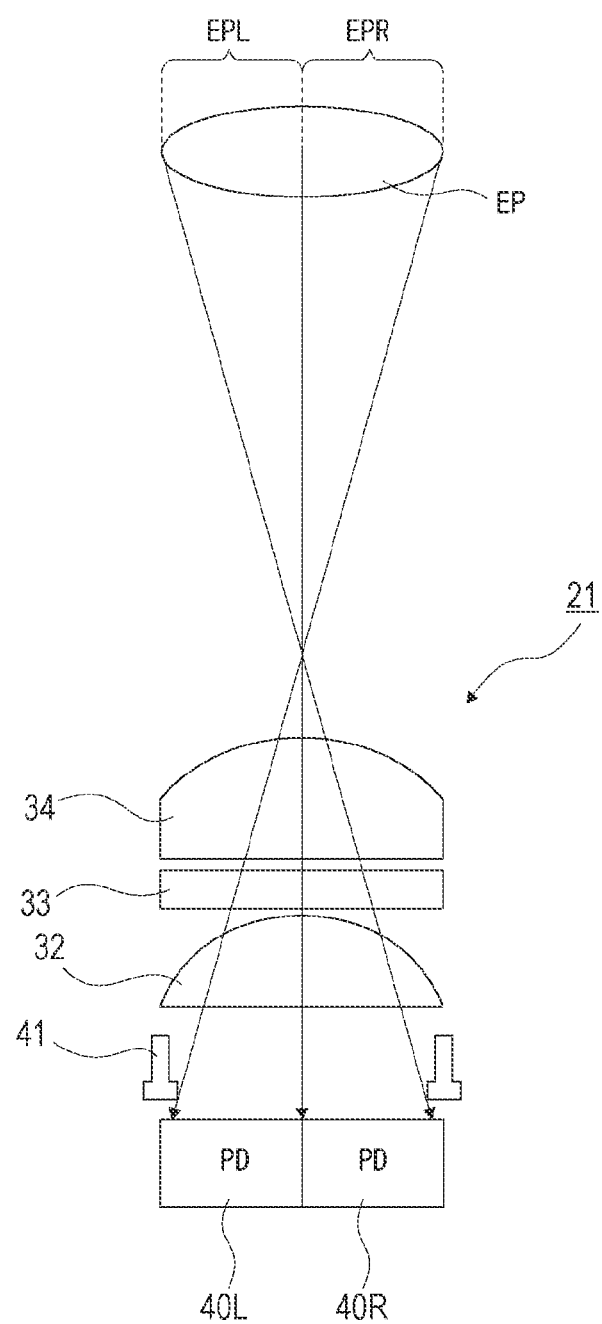
FIG. 6 is an explanatory view of a configuration example of a PD divided pixel arranged on an on-axis region.

FIG. 6 schematically illustrates a configuration of the PD divided pixel 21.

The PD divided pixel 21 includes two divided pixels, that is, a left PD 40L as a divided pixel on a left side and a right PD 40R as a divided pixel on a right side, a pixel boundary metal 41 arranged in front of the left PD 40L and the right PD 40R, an inner lens 32, a color filter 33, an on-chip microlens 34. The color filter 33 is any one of a color filter 33R having red (R) spectral sensitivity, a color filter 33G having green (G) spectral sensitivity, and a color filter 33B having blue (B) spectral sensitivity. Note that there is also a configuration example in which the inner lens 32 and the like are not provided.

As illustrated, the left PD 40L receives light that has passed through a right pupil region EPR of an exit pupil EP. The right PD 40R receives light that has passed through a left pupil region EPL. Therefore, a pupil division function is realized.

Such PD divided pixels 21 are arrayed as R pixels, G pixels, and B pixels as in FIG. 5 due to differences in the color filter 33.

For example, in a case of a G pixel as one PD divided pixel 21, a signal obtained as an addition value of the left PD 40L and the right PD 40R is a signal of one G pixel. Furthermore, phase difference detection can be performed with values of the left PD 40L and the right PD 40R.

Returning to FIG. 3, the description will be given. The camera signal processing unit 8 includes, for example, a microprocessor specialized in digital signal processing such as a digital signal processor (DSP), a microcomputer, or the like.

The camera signal processing unit 8 performs various types of signal processing for digital signals (imaged image signals) transmitted from the imaging element 7.

Specifically, such as correction processing between color channels of R, G, and B, white balance correction, aberration correction, and shading correction is performed.

Furthermore, the camera signal processing unit 8 performs YC generation processing in which a brightness (Y) signal and a color (C) signal are generated (separated), processing of adjusting brightness and color, and each of processing such as knee correction and gamma correction, by using the image data of R, G, and B.

Moreover, the camera signal processing unit 8 performs conversion into a final output format by performing resolution conversion processing, codec processing of performing encoding for recording or communication, and the like. The image data converted into the final output format is stored in the memory unit 15. Furthermore, when the image data is output to the display unit 10, the image is displayed on the rear monitor 4 or the EVF monitor 5a. Moreover, by being output from an external output terminal, it is displayed on a device such as a monitor provided outside the imaging apparatus 1.

The camera signal processing unit 8 includes a phase difference detection unit 8a.

The phase difference detection unit 8a performs phase difference detection from output signals of the left PD 40L and the right PD 40R of the PD divided pixel 21. Then, the phase difference detection unit 8a calculates a defocus amount on the basis of the detected phase difference information. The calculated defocus amount may be utilized for an autofocus (AF) function by being used for driving the focus lens included in the optical system 16 via the barrel control unit 18. Furthermore, the defocus amount may be used for presentation of information regarding the degree of focus of the subject to a user.

The recording unit 9 includes, for example, a nonvolatile memory, and stores image files (content files) such as still image data or moving image data, attribute information of the image files, thumbnail images, and the like.

The image files are stored in a format such as joint photographic experts group (JPEG), tagged image file format (TIFF), and graphics interchange format (GIF), for example.

Various forms are conceivable as the actual form of the recording unit 9. For example, the recording unit 9 may include a flash memory incorporated in the imaging apparatus 1, or may include a memory card (for example, a portable flash memory) attachable to and detachable from the imaging apparatus 1 and an access unit that performs access for storage and readout to the memory card.

Furthermore, it may be realized in a form of a hard disk drive (HDD) and the like incorporated in the imaging apparatus 1.

The display unit 10 executes processing for performing various displays for the imaging person. The display unit 10 is, for example, the rear monitor 4 or the EVF monitor 5a. The display unit 10 performs processing of displaying image data that is input from the camera signal processing unit 8 and is converted into an appropriate resolution. Therefore, a so-called through image that is an image imaged during release standby is displayed.

Moreover, the display unit 10 realizes a display as a graphical user interface (GUI) such as various manipulation menus, icons, messages, and the like, on the screen, on the basis of an instruction from the camera control unit 14.

Furthermore, the display unit 10 can display a reproduced image of the image data read out from a recording medium in the recording unit 9.

Note that, in the present example, both the EVF monitor 5a and the rear monitor 4 are provided, but the implementation of the present technology is not limited to such a configuration, and only either one of the EVF monitor 5a or the rear monitor 4 may be provided, or either one of the EVF monitor 5a or the rear monitor 4 or both of them may be configured to be attachable and detachable.

The output unit 11 performs data communication or network communication with an external device in a wired or wireless manner. For example, transmission of imaged image data (still image files and moving image files) to a display apparatus, a recording apparatus, a reproduction apparatus, or the like provided outside is performed.

Furthermore, the output unit 11 may function as a network communication unit. For example, communication may be performed through various networks such as the Internet, a home network, or a local area network (LAN) to perform various types of data transmission and reception with a server, a terminal, and the like on the network.

The manipulation unit 12 provided in the camera housing 2 includes not only the above-described various manipulation elements 6, but also the rear monitor 4 employing a touch panel system and the like, and outputs manipulation information according to various manipulations such as a tap manipulation and a swipe manipulation by an imaging person to the camera control unit 14.

Note that the manipulation unit 12 may function as a reception unit of an external manipulation device such as a remote controller separate from the imaging apparatus 1.

The power supply unit 13 generates a power supply voltage (Vcc) necessary for each unit from, for example, a battery filled inside, and supplies it as an operating voltage.

The power supply unit 13 is configured to supply the power supply voltage Vcc also to a circuit in the lens barrel 3 in a state where the lens barrel 3 is attached to the imaging apparatus 1.

Note that a circuit for performing charging to the battery and a circuit for generating the power supply voltage Vcc, using a DC voltage converted and input by an AC adapter connected to a commercial AC power supply as the power supply, may be formed in the power supply unit 13.

The camera control unit 14 includes a microcomputer (arithmetic processing unit) that includes a central processing unit (CPU), and performs comprehensive control of the imaging apparatus 1. For example, control of a shutter speed according to a manipulation by an imaging person, an instruction of various types of signal processing in the camera signal processing unit 8, an imaging operation and a recording operation according to a user manipulation, and a reproduction operation of recorded image files are performed.

The camera control unit 14 performs switching of various image capture modes and the like. The various image capture modes are, for example, a still image capture mode, a moving image capture mode, a continuous shooting mode for continuously acquiring still images, and the like.

The camera control unit 14 includes a user interface control unit (UI control unit) 14a for enabling a user to manipulate these functions. The UI control unit 14a performs processing of detecting a manipulation with respect to each manipulation element 6 provided in the imaging apparatus 1, display processing and operation detection processing with respect to the rear monitor 4, and the like.

Furthermore, the camera control unit 14 performs an instruction with respect to the barrel control unit 18 for controlling various lenses included in the optical system 16.

For example, processing of designating an aperture value for securing a light amount necessary for AF control, an operation instruction of an aperture mechanism according to an aperture value, and the like are performed.

The camera control unit 14 can acquire information concerning various lenses included in the optical system 16 via the barrel control unit 18. The information about the lens includes, for example, information about model number of the lenses, a position of the zoom lens, F values, information about an exit pupil position, or the like. Furthermore, the camera control unit 14 can acquire an aperture value of the aperture mechanism included in the optical system 16.

The memory unit 15 stores information and the like used for processing executed by the camera control unit 14. As the illustrated memory unit 15, for example, a read only memory (ROM), a random access memory (RAM), a flash memory, and the like are inclusively illustrated.

The memory unit 15 may be a memory region incorporated in a microcomputer chip as the camera control unit 14, or may include a separate memory chip.

Programs and the like utilized by the camera control unit 14 are stored in the ROM, the flash memory, and the like of the memory unit 15. In addition to an operating system (OS) for controlling each unit by the CPU and content files such as image files, application programs and firmware for various operations and the like are stored in the ROM, the flash memory, and the like.

The camera control unit 14 controls the imaging apparatus 1 and the lens barrel 3 as a whole by executing the programs.

The RAM of the memory unit 15 is utilized as a work region of the camera control unit 14 by temporarily storing data, programs, and the like used at the time of various types of data processing executed by the CPU of the camera control unit 14.

The barrel control unit 18 of the lens barrel 3 includes, for example, a microcomputer, and outputs a control signal to the driver unit 17 for actually driving various lenses of the optical system 16 on the basis of the instruction from the camera control unit 14.

Note that information communication between the camera control unit 14 and the barrel control unit 18 may be enabled only in a state where the lens barrel 3 is attached to the camera housing 2, or may be enabled by wireless communication in a state where the lens barrel 3 is not attached to the camera housing 2.

The barrel control unit 18 transmits information about the position of the exit pupil and the pupil distance of the exit pupil to the camera control unit 14 on the basis of the types and drive positions of various lenses included in the optical system 16. Specifically, information regarding the pupil distance is acquired from information stored in the ROM as the memory unit 20, and is transmitted to the camera control unit 14.

The driver unit 17 is provided with, for example, a motor driver for a zoom lens drive motor, a motor driver for a focus lens drive motor, an aperture mechanism driver for a motor driving the aperture mechanism, and the like.

Each driver supplies a drive current to the corresponding driver motor in response to an instruction from the barrel control unit 18.

The manipulation unit 19 of the lens barrel 3 indicates a manipulation element provided on a lens barrel 3 side. The manipulation information by the manipulation unit 19 is supplied to the barrel control unit 18, and is provided in notification to the camera control unit 14 via the barrel control unit 18.

Operation control of the optical system 16 by the barrel control unit 18, and various settings and operation control by the camera control unit 14 are performed in response to a manipulation of the manipulation unit 19.

The manipulation unit 19 may function as a reception unit of an external manipulation device such as a remote controller separate from the lens barrel 3.

The memory unit 20 includes a ROM, a flash memory, and the like, and stores programs, data, and the like utilized by the barrel control unit 18. The memory unit 20 stores an operating system (OS) for controlling each unit by the CPU, application programs and firmware for various operations, and the like.

Furthermore, information stored in the memory unit 20 includes information about the pupil distance of the exit pupil of the optical system 16 and the like.

<2. Readout Operation According to Comparative Example>

Here, as a comparative example, an event will be described in which response of the AF operation is delayed in a case of performing readout of pixel values from the imaging element 7 including the PD divided pixels 21. Note that readout refers to a case of performing rolling shutter readout.

In a case of the imaging element 7 where the PD divided pixels 21 including the left PD 40L and the right PD 40R are arrayed as in FIG. 5, in each PD divided pixel 21, not only a normal pixel signal for image generation can be read out, but also a phase difference signal can be obtained by obtaining values of left and right PDs separately. A defocus amount can be calculated from the phase difference signal, and autofocus (AF) control can be executed.

Accordingly, it is conceivable to perform readout twice for one horizontal line so as to perform, for example, (L+R) readout and L readout for one PD divided pixel 21.

Note that the "(L+R) readout" refers to readout in which charges from the left PD 40L and the right PD 40R are added. The "L readout" refers to charge readout from the left PD 40L, and "R readout" refers to charge readout from the right PD 40R. Furthermore, an "L value" is a pixel signal value obtained by direct readout or arithmetic operation from the left PD 40L, and an "R value" is a pixel signal value obtained by direct readout or arithmetic operation from the right PD 40R. Furthermore, an (L+R) value is an addition value of the pixel signal values of the left PD 40L and the right PD 40R.

Since the (L+R) value, that is, an addition value of readout charges from the left PD 40L and the right PD 40R, has a meaning as a pixel value of the PD divided pixel 21, it is a signal used for image generation.

Furthermore, L readout is performed to obtain a signal value (L value) of the left PD 40L, and a signal value (R value) of the right PD 40R is obtained by the (L+R) value−the L value. A phase difference of the pixel components that are pupil-divided can be obtained from the "L value" and the "R value", and AF control can be performed on the basis of the phase difference.

Figure 7:
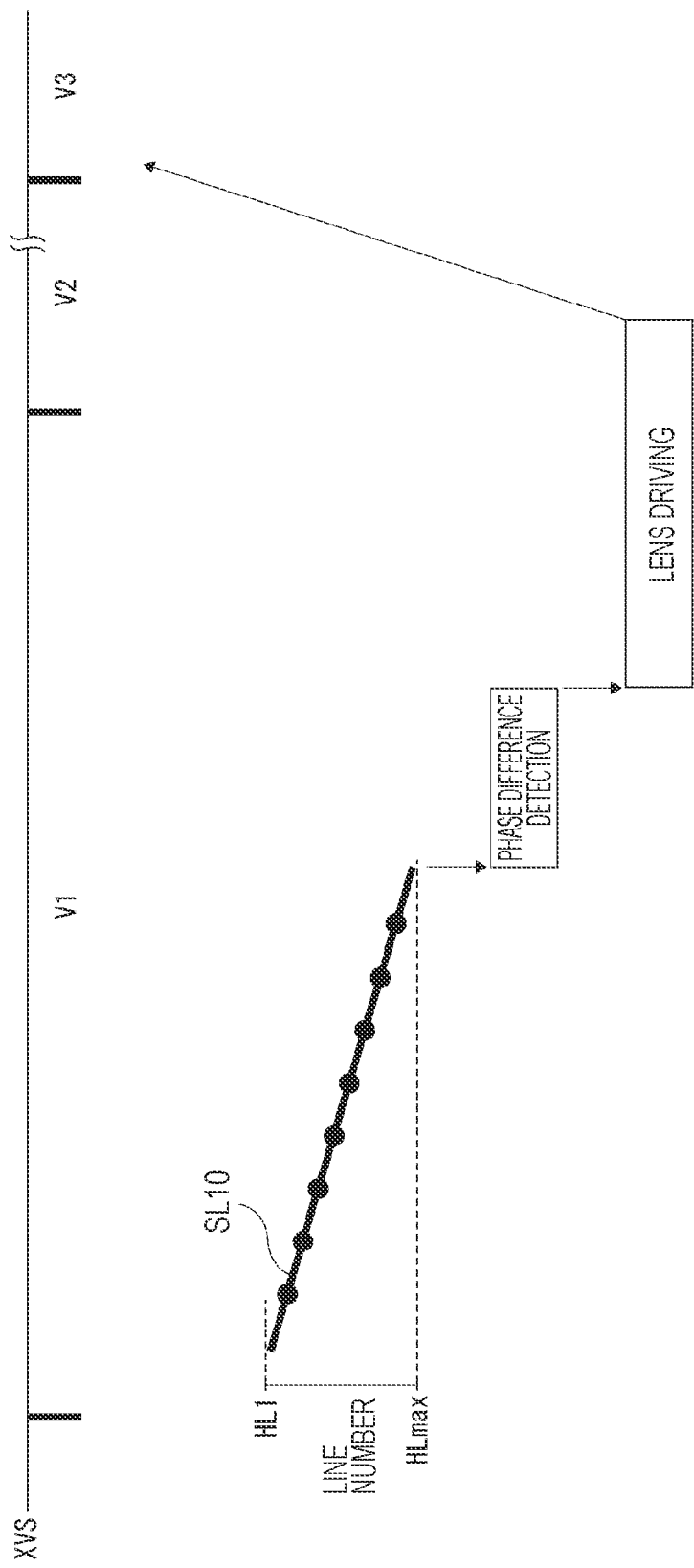
FIG. 7 is an explanatory view of a readout operation according to a comparative example.

FIG. 7 schematically represents such a readout operation.

In FIG. 7, in vertical periods (V1, V2 . . . ) defined by a vertical synchronization signal XVS, readout timings for respective horizontal lines when assuming the vertical axis as horizontal line numbers are indicated as a straight line SL10. The head horizontal line number is "HL1", and the last horizontal line number is "HLmax". The "•" described on the straight line SL 10 indicates a horizontal line for which readout for phase difference detection is also performed.

For example, assuming that readout for phase difference detection is performed every forty-eight lines, a readout operation for each PD divided pixel 21 for each horizontal line is as follows.

First horizontal line: (L+R) readout
Second horizontal line: (L+R) readout
Third horizontal line: (L+R) readout
(hereinafter, (L+R) readout being similarly performed up to a forty-seventh horizontal line))
Forty-eighth horizontal line: L readout
Forty-eighth horizontal line: (L+R) readout
Forty-ninth horizontal line: (L+R) readout
Fiftieth horizontal line: (L+R) readout
(hereinafter, (L+R) readout being similarly performed up to a ninety-fifth horizontal line)
Ninety-sixth horizontal line: L readout
Ninety-sixth horizontal line: (L+R) readout
Ninety-seventh horizontal line: (L+R) readout
Ninety-eighth horizontal line: (L+R) readout In this manner, both the L readout and the (L+R) readout are performed for the periodic horizontal lines (in the above example, the forty-eighth horizontal line and the ninety-sixth horizontal line).

This is because when both the L readout and the (L+R) readout are performed for all the horizontal lines, readout time for one frame becomes longer.

However, performing readout for image generation and readout for phase difference detection in this manner may cause a case where the AF operation is delayed.

After reading out the L value and the (L+R) value, R value is calculated to perform the phase difference detection and calculation of the defocus amount. Since this processing is performed after the necessary L value and (L+R) value are obtained, it is the period illustrated as "phase difference detection" in FIG. 7. That is, it is after readout of all (or a part of, in a case of performing thinning-out) the horizontal lines for one frame is completed. That is, it becomes possible to execute the phase difference detection for the AF operation after having passed a period indicated by the straight line SL 10 including readout for pixel generation.

The camera control unit 14 performs lens drive control on the basis of the result of the phase difference detection, and driving of the focus lens is actually performed to focus on the subject.

In such a case, as illustrated in the drawing, there arises a delay in reflection of an in-focus state until not the next frame (the timing in the vertical period V2), but further next frame (the timing in the vertical period V3). This is because the start timing of the phase difference detection is after readout for one frame.

Such a delay in the AF operation is undesirable because the user is likely to feel an influence particularly in a case where a moving subject is imaged.

Furthermore, in a light environment (bright environment), the frame rate is changed to be high by automatic exposure (AE) control, and when the 1V period becomes shorter, the delay in the AF control described above tends to be noticeable.

Therefore, in the embodiment, a readout operation that does not cause such a delay in responsiveness of the AF operation is performed.

<3. Readout Operation According to First Embodiment>

Figure 8:
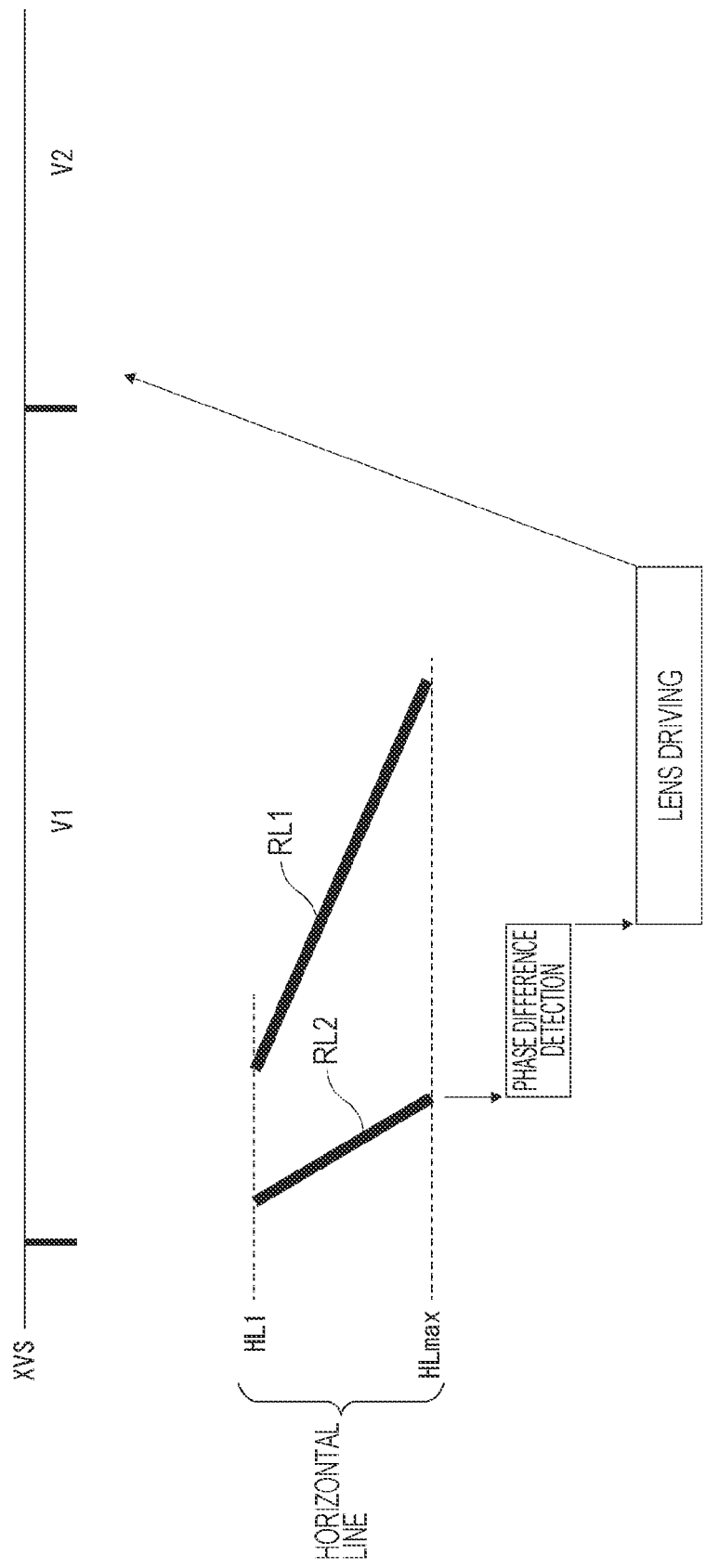
FIG. 8 is an explanatory view of a readout operation in a bright environment according to a first embodiment.

FIG. 8 schematically illustrates a readout operation as a first embodiment.

In FIG. 8, a lateral direction is a time axis, and the vertical periods V1, V2 defined by the vertical synchronization signal XVS are illustrated. As the vertical periods V1, V2 . . . , for example, a case is assumed where the user performs half-pressing the shutter button 6S, and the camera control unit 14 causes the display unit 10 to execute display of the live view image, and performs the AF control. An image signal for the live view image for one frame is obtained in one vertical period.

Furthermore, in the drawing, solid lines RL1, RL2 are illustrated assuming the vertical axis as horizontal line numbers ("HL1" to "HLmax"). The solid lines RL1, RL2 indicate readout timings for respective horizontal lines.

As illustrated in the drawing, in one vertical period, readout (second readout) of the solid line RL2 is performed first, and readout (first readout) of the solid line RL1 is subsequently performed.

Although not represented in FIG. 8, since the first readout and the second readout are targeted at different horizontal lines as illustrated in FIGS. 9A, 9B described later, it is sufficient if exposure is performed before each readout, and it is sufficient if the timing and length of the exposure of each horizontal line are not particularly defined, and is appropriately set.

The first readout indicated by the solid line RL1 is readout for generating live view images, and the (L+R) readout from each PD divided pixel 21, as a pixel value, is performed.

As an example, description will be made assuming that the (L+R) readout is performed in a cycle of six horizontal lines in one vertical period.

FIG. 9A schematically illustrates an operation of the first readout. The charge readout of the L value+the R value from each horizontal line is performed, and the target horizontal lines are four out of six lines.

The (L+R) readout is performed for respective PD divided pixels 21 in each of four horizontal lines. Moreover, the (L+R) values read out from the four PD divided pixels 21 in the vertical direction are added (such addition is written as "vertical addition" to distinguish it from addition of the L value+the R value) to obtain one pixel signal.

That is, the pixel value for generating a live view image is, for example, a vertical addition value of the PD divided pixels 21 in four horizontal lines out of six horizontal lines for every six horizontal lines, and this is obtained as one pixel value for generating a live view image.

Such readout is performed, for example, from the head horizontal line HL1 side toward the last horizontal line HLmax side in a cycle of six lines.

Note that, for example, as simple thinning-out readout, the (L+R) value may be read out from one horizontal line for every six horizontal lines to obtain one pixel signal. However, by performing vertical addition, a sufficient level can be easily obtained as a signal level even in a case where the amount of received light is relatively small, which is advantageous.

Note that FIG. 9A is merely schematically illustrated, and vertical addition is performed for a plurality of pixels connected to the same vertical signal line VSL to be described later with reference to FIG. 13 and provided with color filters of the same color. A similar applies to the vertical addition illustrated in FIG. 9C.

Furthermore, these are voltage addition in the vertical signal line VSL.

The second readout indicated as the solid line RL2 in FIG. 8 is readout for phase difference detection, and the L readout and the (L+R) readout from the PD divided pixel 21, as pixel values, are performed.

As schematically illustrated in FIG. 9B, in each cycle of six horizontal lines in one vertical period, the L readout and the (L+R) readout from the PD divided pixel 21 in at least one horizontal line out of the horizontal lines for which the first readout is not performed are performed.

That is, in the second readout, the L readout and the (L+R) readout are performed for, as a target, the PD divided pixel 21 in one horizontal line for every six horizontal lines.

In the readout, for example, after the readout of the L value from the left PD 40L, processing of readout of the image signal of the right PD 40R is performed without resetting the charge. That is, the (L+R) value is read out by performing addition of the L value and the R value in a floating diffusion (FD) unit in the imaging element.

Such readout is performed, for example, from the head horizontal line HL1 side toward the last horizontal line HLmax side in a cycle of six lines.

Such first readout and second readout are performed in one vertical period, but as illustrated in FIG. 8, the second readout is performed first, and then the first readout is performed.

The phase difference detection is performed at a point of time at which the second readout is completed without waiting for the completion of the readout for the image generation, and lens driving can be subsequently executed. Accordingly, the AF operation can be reflected at the timing in the next vertical period V2. Therefore, good AF performance can be realized also with respect to, for example, a moving subject.

By the way, the readout operation as in FIG. 8 may be performed irrespective of bright or dark, but it is also desirably performed when it is determined as a bright environment. This is because AF responsiveness is highly likely to decrease when the frame rate increases in a bright environment and the vertical period becomes shorter, and thus AF operation responsiveness can be improved by performing the second readout and the first readout as in FIG. 8.

Figure 10:
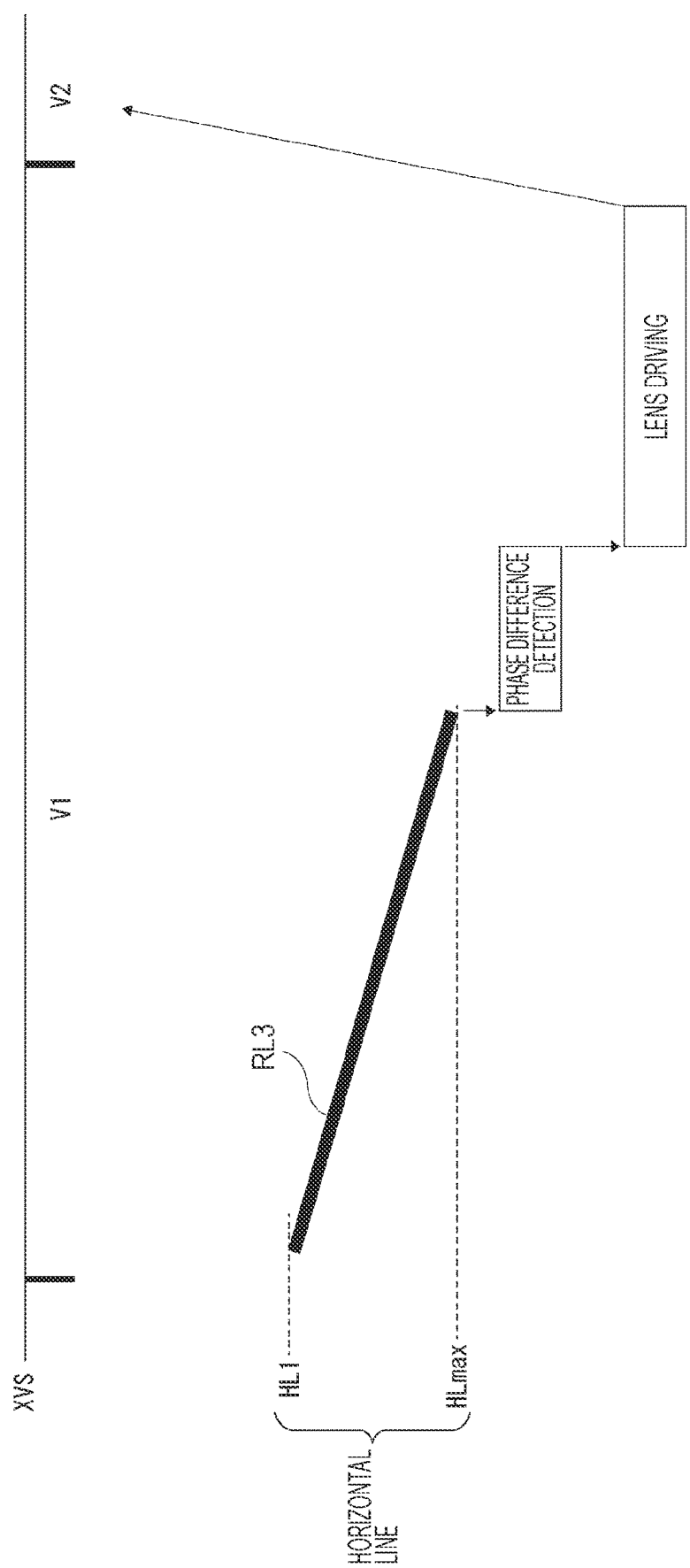
FIG. 10 is an explanatory view of a readout operation in a dark environment according to the first embodiment.

On the other hand, in a case where it is determined as a dark environment, it is conceivable to perform third readout indicated by a solid line RL3 as in FIG. 10.

In the third readout, readout for image generation and readout for phase difference detection are performed for, as targets, the PD divided pixels 21 in the same horizontal lines. That is, the readout period is not divided as in the above-described first readout and second readout.

FIG. 9C schematically illustrates an operation of the third readout. Similar to when it is a bright environment, thinning-out readout is performed in a cycle of six horizontal lines in a similar manner.

Charge readout of the L value+the R value is performed as readout for generating a live view image. However, similar to FIG. 9A, the target horizontal lines are four out of six lines, and the (L+R) readout is performed for the respective PD divided pixels 21 in each of four horizontal lines, and the (L+R) values read out from the four PD divided pixels 21 in the vertical direction are vertically added to obtain one pixel value.

At the same time, the L readout from those four PD divided pixels 21 is performed as readout for the phase difference detection. In this case, also with respect to the L value, the L values of the four PD divided pixels 21 in the vertical direction are vertically added to obtain one pixel value.

The R value is obtained by subtracting the L value obtained by vertical addition from the (L+R) value obtained by vertical addition.

In this case, for example, it is possible to read out the L value and the (L+R) value from the PD divided pixel 21 in one horizontal line without performing vertical addition as in FIG. 9B, but low illuminance performance can be improved by using the (L+R) value and the L value each obtained by vertical addition.

The third readout indicated by the solid line RL3 in FIG. 8 performed as in FIG. 9C is as follows in an example of the cycle of six horizontal lines.

First to sixth horizontal lines: L readout (vertical addition readout for 4/6 lines)

First to sixth horizontal lines: (L+R) readout (vertical addition readout for 4/6 lines)

Seventh to twelfth horizontal lines: L readout (vertical addition readout for 4/6 lines)

Seventh to twelfth horizontal lines: (L+R) readout (vertical addition readout for 4/6 lines)

(hereinafter, similarly for every six horizontal lines)

The phase difference detection is performed after such third readout, and the lens driving can be subsequently executed. The phase difference detection is started after the readout of the pixel signals for one frame, but in this case, it is a dark environment, and the frame rate decreases in the dark environment and the vertical period becomes longer. Accordingly, the AF operation can be reflected at the timing in the next vertical period V2. Therefore, for example, good AF performance can be maintained.

In addition, the number of pixels (the number of horizontal lines) for which readout of the (L+R) value and readout of the L value are performed can be reduced as compared with the case where the second readout and the first readout are separately performed as in FIG. 8.

Figure 9:
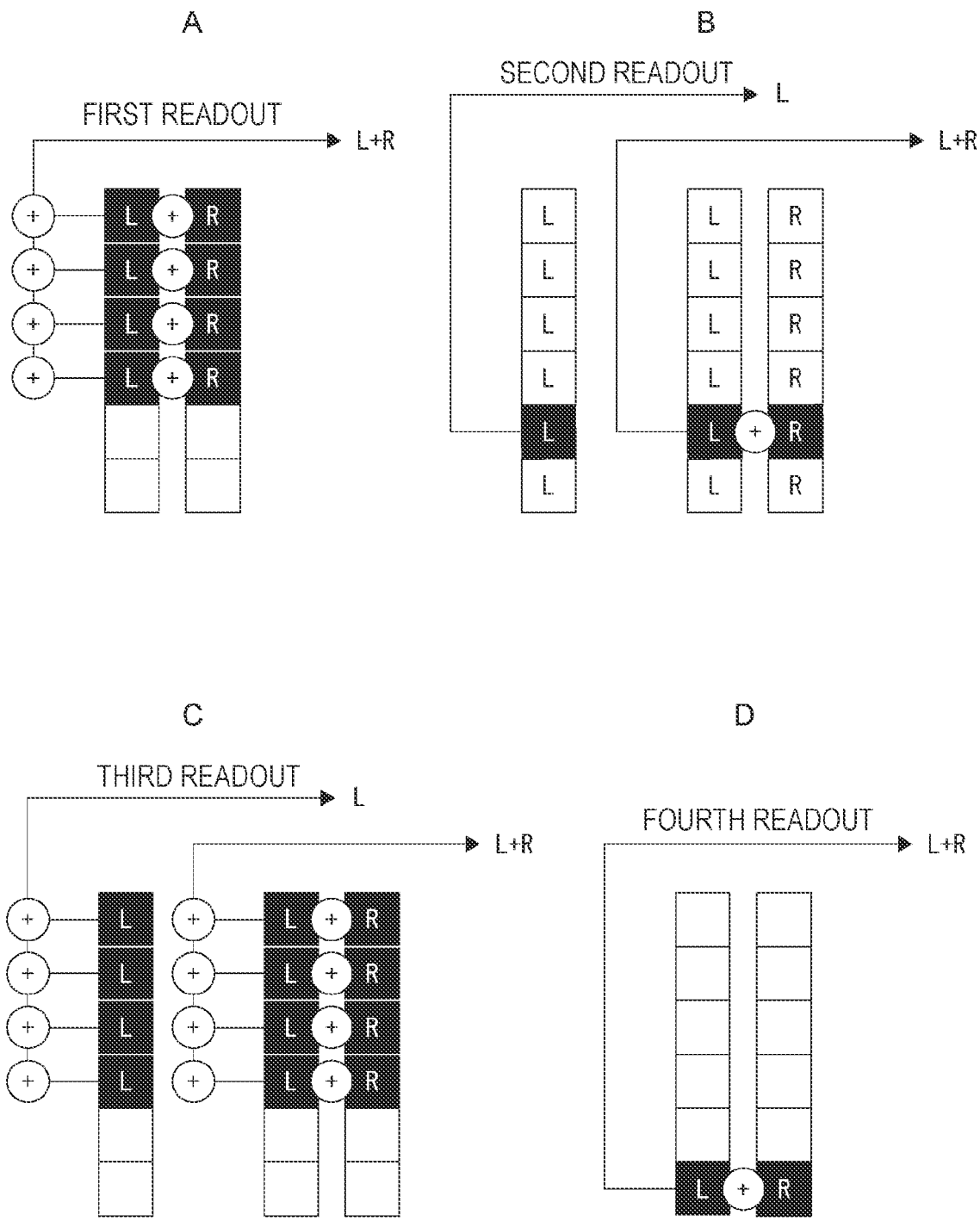
FIG. 9 is a schematic explanatory view of modes of readout according to the embodiment.

For example, in the examples in FIG. 9, readout is performed for a total of five horizontal lines out of six by the second readout and the first readout, but readout is performed for four horizontal lines out of six by the third readout. Therefore, a power-saving effect can be obtained.

Figure 11:
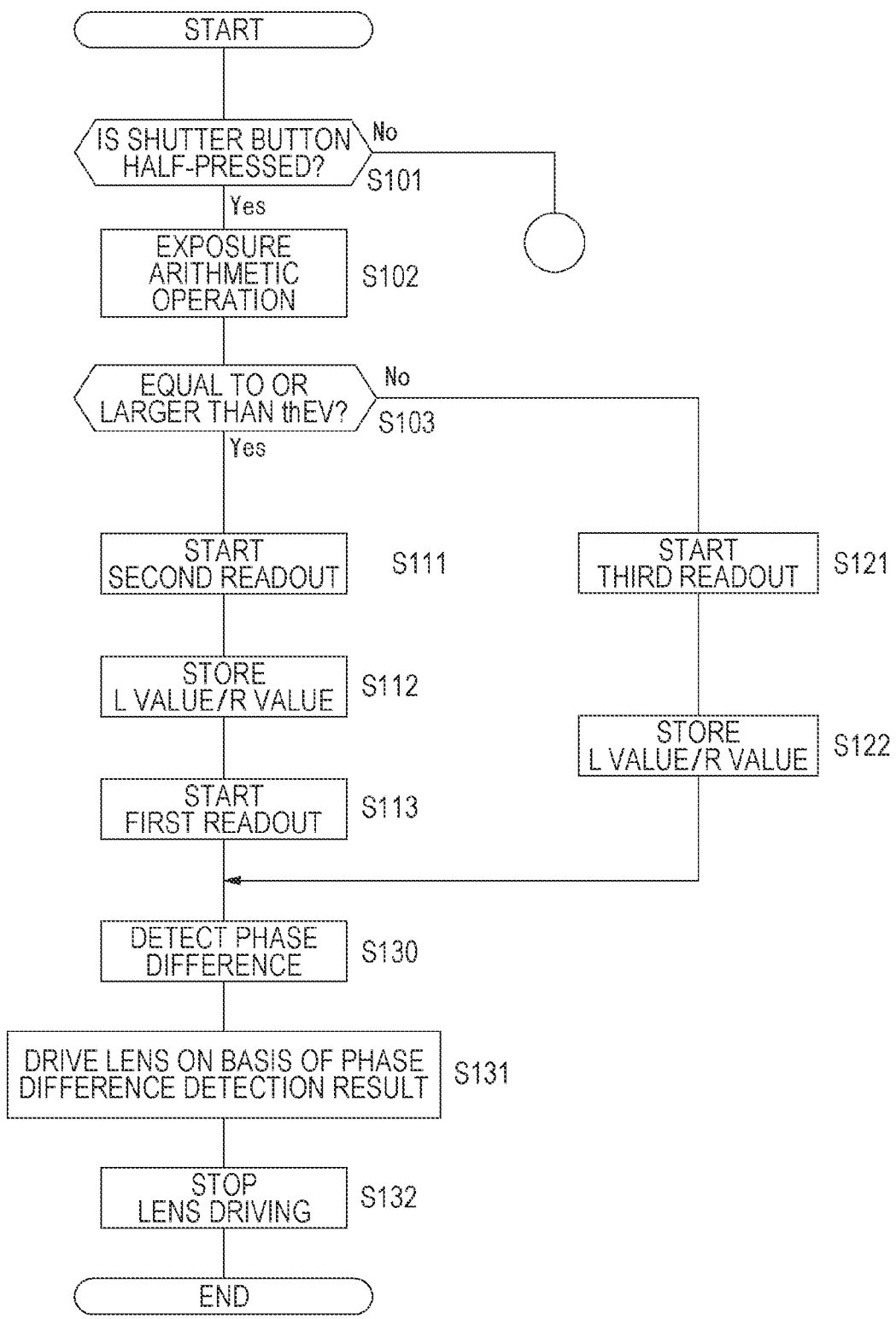
FIG. 11 is a flowchart of control of readout and an AF operation according to the first embodiment.

The above readout operations as in FIGS. 8, 10 are executed on the basis of control by the camera control unit 14. FIG. 11 illustrates an example of control processing by the camera control unit 14.

In step S101 in FIG. 11, the camera control unit 14 is monitoring half-pressing of the shutter button 6S. While half-pressing is not being performed, other processing (not illustrated) is performed.

While half-pressing is being performed, processing in FIG. 11 proceeds to step S102 and to the subsequent steps every one vertical period.

When detecting half-pressing of the shutter button 6S, the camera control unit 14 performs exposure arithmetic operation in step 3102. This exposure arithmetic operation is performed for determining the shutter speed and an AGC gain for the readout signal, that is, performed for automatic exposure control (AE control).

Figure 12:
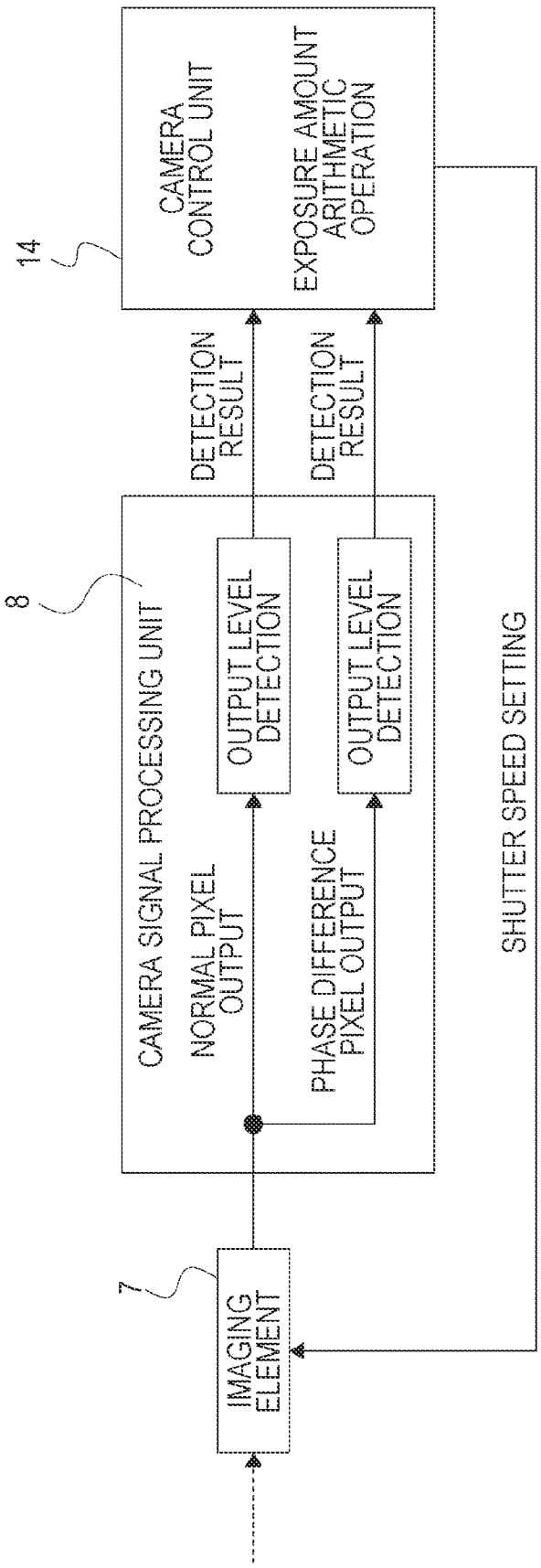
FIG. 12 is a block diagram of a configuration related to calculation of an exposure amount, according to the embodiment.

FIG. 12 illustrates a processing block for calculating an exposure amount as exposure arithmetic operation.

A normal pixel output for generating an image signal and a phase difference pixel output as a phase difference signal for AF control are obtained from the imaging element 7. Here, the normal pixel output is (L+R) values from the PD divided pixels 21, and the phase difference pixel output is L values and R values.

The normal pixel output and the phase difference pixel output are each input to an output level detection circuit included in the camera signal processing unit 8. The output level detection circuit calculates an output average value in an exposure calculation target region on the pixel on the basis of the input normal pixel output and the input phase difference pixel output, and each output average value is output from the camera signal processing unit 8, and input to the camera control unit 14.

The camera control unit 14 performs exposure amount calculation according to the detection result output from the camera signal processing unit 8, and determines the shutter speed (or a parameter capable of adjusting the exposure amount such as an F value or a gain). The camera control unit 14 performs processing of setting the determined shutter speed in the imaging element 7.

The exposure amount calculation performed in the camera control unit 14 may be performed on the basis of only the normal pixel output, or may be performed on the basis of only the phase difference pixel output. Alternatively, the exposure amount calculation may be performed on the basis of both the normal pixel output and the phase difference pixel output. In any case, the bright or dark (illuminance) environment can be determined by the exposure amount calculation.

In step S103, the camera control unit 14 determines whether it is a bright environment or a dark environment. For example, it is determined whether or not the exposure value (EV) obtained by the above-described exposure amount calculation is equal to or larger than a threshold thEV. For example, with the threshold thEV=EV 10, it is determined whether or not the calculated value is equal to or larger than EV 10.

When the EV is equal to or larger than the threshold thEV, it is determined as a bright environment, and the processing proceeds to step S111.

In this case, the camera control unit 14 performs the readout control in FIG. 8. First, the second readout is executed in step S111. In the imaging element 7, the readout illustrated in FIG. 9B is performed in a cycle of six horizontal lines, for example.

Furthermore, in step S112, the camera control unit 14 causes the camera signal processing unit 8 to obtain the R value from the L value and the (L+R) value read out for every six horizontal lines and to start the processing of storing the L value and the R value.

When the operation started by the control in the above steps S111, S112 is continued and the second readout is completed, in step S113, the camera control unit 14 causes the first readout to be started. That is, the first readout is the readout operation illustrated in FIG. 9A.

The (L+R) value obtained by vertical addition for 4/6 lines for every six horizontal lines read out in the first readout is processed as an image signal of a live view image in the camera signal processing unit 8.

The camera control unit 14 causes the first readout to be started, and controls execution of the phase difference detection in step S130 without waiting for the end of the first readout. That is, after the L value and the R value are stored for each PD divided pixel 21, the phase difference detection is performed by a function of the phase difference detection unit 8a in the camera signal processing unit 8. Then, the defocus amount is transmitted to the camera control unit 14.

In step S131, the camera control unit 14 instructs the barrel control unit 18 according to the defocus amount, and causes the barrel control unit 18 to execute driving of the focus lens included in the optical system 16. Then, in step S132, the lens driving is stopped. Therefore, the AF operation is executed.

When the EV is less than the threshold thEV in step S103, the camera control unit 14 determines that it is a dark environment, and the processing proceeds to step S121.

In this case, the camera control unit 14 performs control to start readout as the third readout in FIG. 10. In the imaging element 7, readout illustrated in FIG. 9C, that is, the L readout (vertical addition readout for 4/6 lines) and the (L+R) readout (vertical addition readout for 4/6 lines) for every six horizontal lines are started.

Furthermore, in step S122, the camera control unit 14 causes the camera signal processing unit 8 to obtain the R value from the L value and the (L+R) value read out for every six horizontal lines and to start the processing of storing the L value and the R value.

When the operation started by the control in the above steps S121, S122 is continued and the third readout is completed, in steps S130, S131, and S132, the camera control unit 14 performs processing in a similar manner as described above. Therefore, the AF operation is executed on the basis of the third readout.

Here, a difference between addition as an (L+R) value and vertical addition will be described with reference to FIG. 13. FIGS. 13A, 13B illustrate modes where signal charges are read out from the PD divided pixels 21 to the vertical signal line VSL.

The addition as the (L+R) value is an FD addition illustrated in FIG. 13A, and indicates that charges of the left PD 40L and the right PD 40R constituting the PD divided pixel 21 are added by the floating diffusion FD and read out.

On the other hand, the vertical addition performed for the (L+R) values or the L values is a source follower (SF) addition illustrated in FIG. 13B, and indicates that the signals read out from the PD divided pixels 21 are subjected to the voltage addition in the vertical signal line VSL.

Note that, in the above description, an example has been given in which readout is performed in a cycle of six horizontal lines in the first readout, the second readout, and the third readout, but setting six horizontal lines as one cycle is an example. Furthermore, for example, it is conceivable to cause a change in the number of horizontal lines in one cycle according to the lightness.

That is, when the number of horizontal lines in one cycle is N, the number of N is variable.

Furthermore, as in FIGS. 9A, 9C, in the first readout and the third readout, vertical addition is performed for the PD divided pixels 21 in the vertical direction in the horizontal lines of less than (N−1) (four in the above example) out of N horizontal lines, but the number of horizontal lines to be subjected to the vertical addition may be variable according to the brightness. In particular, it is preferable to reduce the number of pixels to be vertically added as the brightness increases, and to increase the number of pixels to be vertically added as the brightness decreases.

<4. Readout Operation According to Second Embodiment>

As a second embodiment, an example of a case will be described where the imaging element 7 is of a hybrid type including the PD divided pixels 21 and light shielding pixels 23.

Figure 14:
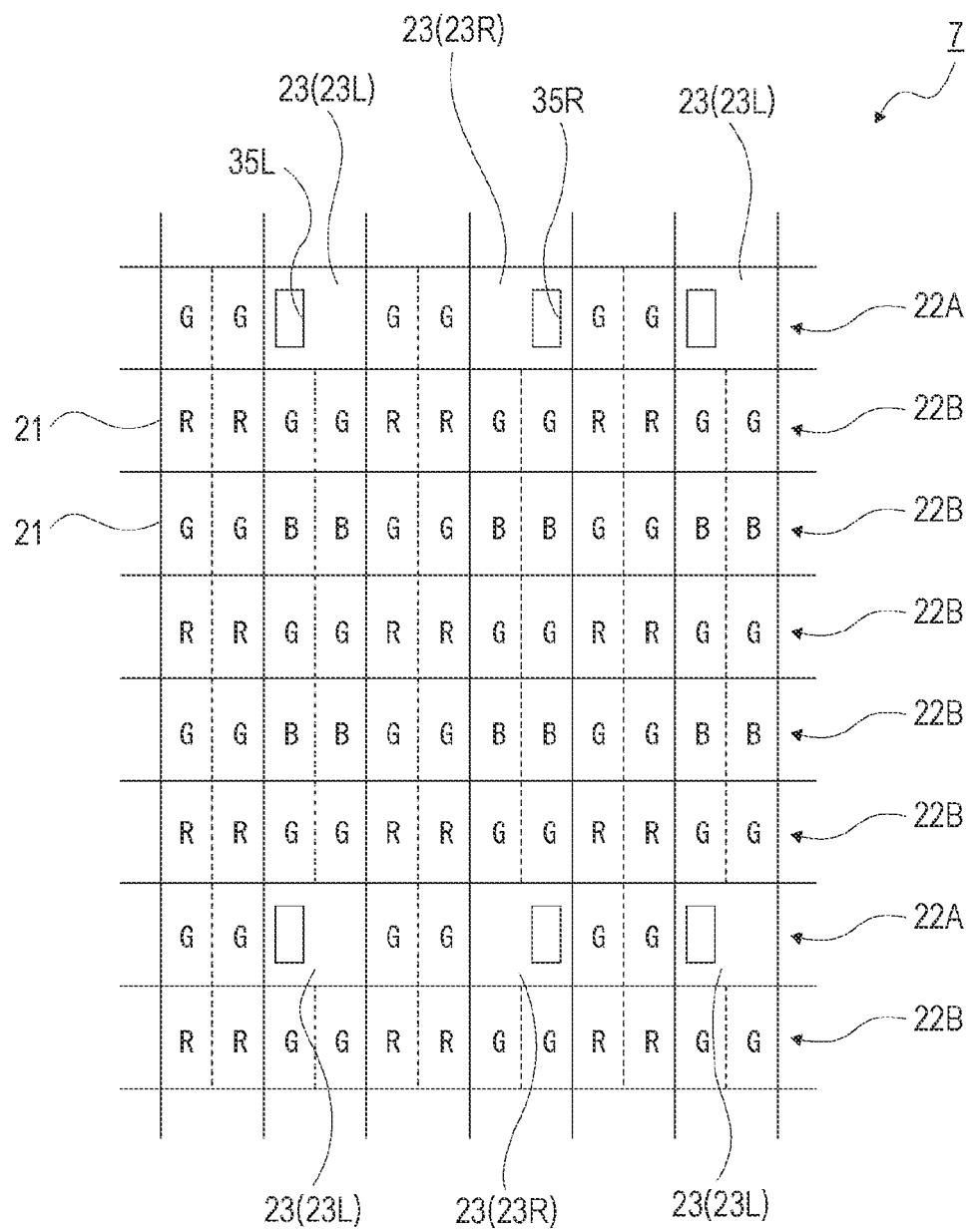
FIG. 14 is an explanatory view of an imaging element including light shielding pixels and PD divided pixels, according to the embodiment.

FIG. 14 illustrates a pixel arrangement example of the imaging element 7.

Pixel rows including the light shielding pixels 23 are formed as first pixel rows 22A. The first pixel rows 22A are discretely arranged in the up-and-down direction, and a plurality of rows of second pixel rows 22B is arranged between the first pixel row 22A and the first pixel row 22A.

The first pixel rows 22A may be regularly arranged, or irregularly arranged. However, regular arrangement can relatively suppress the design cost and the manufacturing cost related to the manufacturing of the imaging element 7.

The PD divided pixels 21 included in the second pixel rows 22B are each covered with a color filter having a Bayer array, and fall into either one having the red (R) spectral sensitivity, one having the green (G) spectral sensitivity, or one having the blue (B) spectral sensitivity according to the type of the color filter.

The configuration of the light shielding pixel 23 will be described with reference to the schematic diagram in FIG. 15.

The light shielding pixel 23 includes a PD 30, a light shielding unit 31 arranged in front (on the subject side) of the PD 30, an inner lens 32 arranged in front of the light shielding unit 31, a color filter (cyan) 33 arranged in front of the inner lens 32, and an on-chip microlens 34 arranged in front of the color filter 33.

Note that the light shielding pixel 23 may not be provided with the inner lens 32 and the color filter 33.

The PD 30 is a light receiving element on which a part of light that has passed through the exit pupil EP is incident, but is capable of receiving light only in a partial region in the light receiving region of the PD 30 due to the light shielding unit 31 arranged in front thereof.

That is, the light shielding unit 31 is formed so as to cover a left half region of the PD 30. A right opening 35R is formed in the light shielding unit 31.

The inner lens 32 and the on-chip microlens 34 are optical components provided for efficiently condensing light, which has passed through the exit pupil EP and is incident on one pixel, onto the PD 30.

The color filter 33 is, for example, a filter having cyan (Cy) spectral sensitivity.

Figure 15:
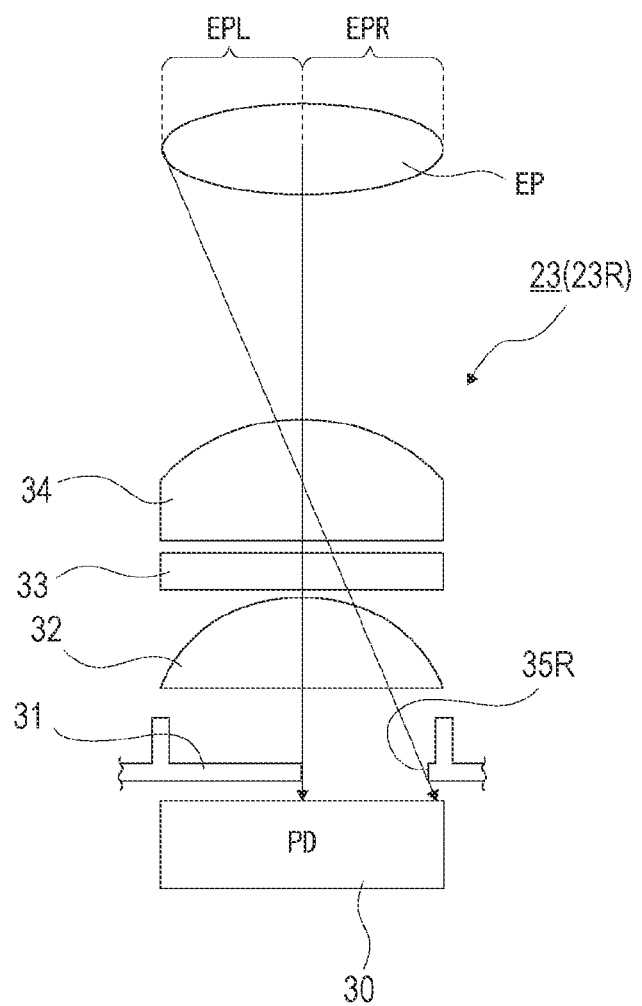
FIG. 15 is an explanatory view of a configuration example of a light shielding pixel arranged on an on-axis region.

As illustrated in FIG. 15, the PD 30 is configured to receive only light that passes through a left side region (left pupil region) that is a left half region of the exit pupil EP. That is, light that passes through a right side region (right pupil region) that is a right half region of the exit pupil EP is shielded by the light shielding unit 31 and does not reach the PD 30. Therefore, a pupil division function is realized.

The light shielding pixel 23 configured to receive light that passes through the left pupil region as illustrated in FIG. 15 is referred to as a light shielding pixel 23R because it receives light in a region deviated toward the right side on the light receiving surface. That is, the right opening 35R is formed in the light shielding pixel 23R.

Furthermore, a light shielding pixel 23L that has a mirror symmetrical configuration with respect to the configuration illustrated in FIG. 15 is the light shielding pixel 23 configured to receive light that passes through the right pupil region, and the pixel receives light in a region deviated toward the left side on the light receiving surface. As illustrated in FIG. 14, a left opening 35L is formed in the light shielding unit 31 included in the light shielding pixel 23L.

As illustrated in FIG. 14, the distance between the light shielding pixel 23R and the light shielding pixel 23L is, for example, a distance corresponding to two pixels, and the light shielding pixel 23R and the light shielding pixel 23L are alternately arranged.

The signal output from the light shielding pixel 23R and the signal output from the light shielding pixel 23L are treated as a pair of phase difference signals by the camera signal processing unit 8 (or the camera control unit 14). That is, the phase difference detection unit 8a of the camera signal processing unit 8 can perform calculation of the defocus amount using the phase difference between the signal output from the light shielding pixel 23R and the signal output from the light shielding pixel 23L.

Note that, in order to enable the camera signal processing unit 8 and the like to specify the pair of phase difference signals, information about which light shielding pixel 23R and which light shielding pixel 23L are paired is stored in advance in a storage region accessible by the camera signal processing unit 8 and the like.

Figure 16:
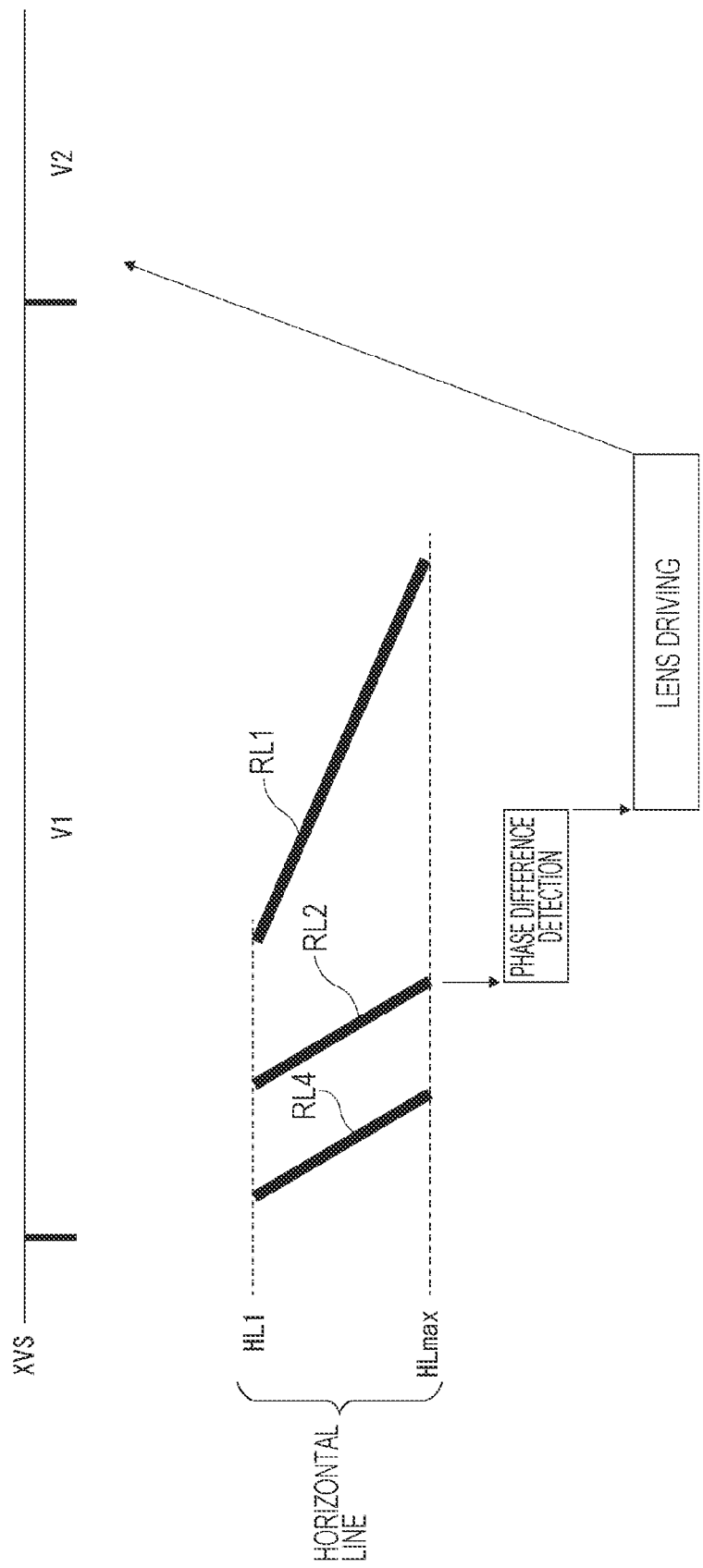
FIG. 16 is an explanatory view of a readout operation in a bright environment according to a second embodiment.
Figure 17:
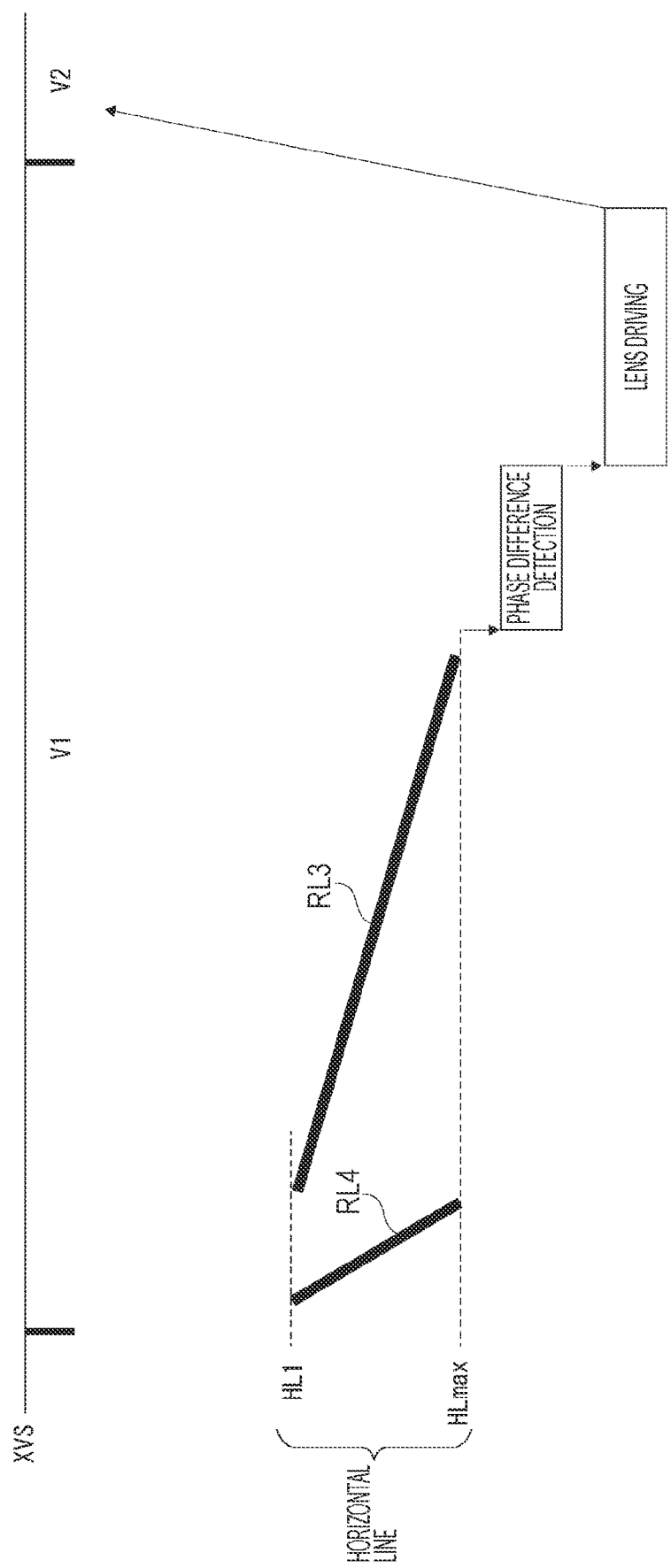
FIG. 17 is an explanatory view of a readout operation in a dark environment according to the second embodiment.

FIG. 16 illustrates a readout operation example in a bright environment in a case where such an imaging element 7 is assumed, and FIG. 17 illustrates a readout operation example in a dark environment.

As illustrated in FIG. 16, in a bright environment, fourth readout illustrated as a solid line RL4 is performed first in a vertical period.

The fourth readout is readout for the phase difference detection, and is to perform (L+R) readout from the light shielding pixels 23 as a pixel value.

As schematically illustrated in FIG. 10D, with respect to a certain horizontal line including light shielding pixels provided according to a predetermined pupil distance, (L+R) readout for the horizontal line is performed in one vertical period. Here, the (L+R) readout is performed to enable significant signal readout from both the light shielding pixel 23R and the light shielding pixel 23L.

After performing the fourth readout in this manner, the second readout is performed as readout for the phase difference detection in the same manner. Then, after performing the fourth readout and the second readout, the first readout is started and the phase difference detection is started, and then the lens driving is executed.

This improves the responsiveness of the AF operation.

Also in a dark environment, as illustrated in FIG. 17, the fourth readout illustrated as the solid line RL4 is performed first in a vertical period. Then, thereafter, the third readout is performed. After the third readout, the phase difference detection is started, and then the lens driving is executed. The reduced frame rate in the dark environment does not significantly affect AF responsiveness.

Figure 18:
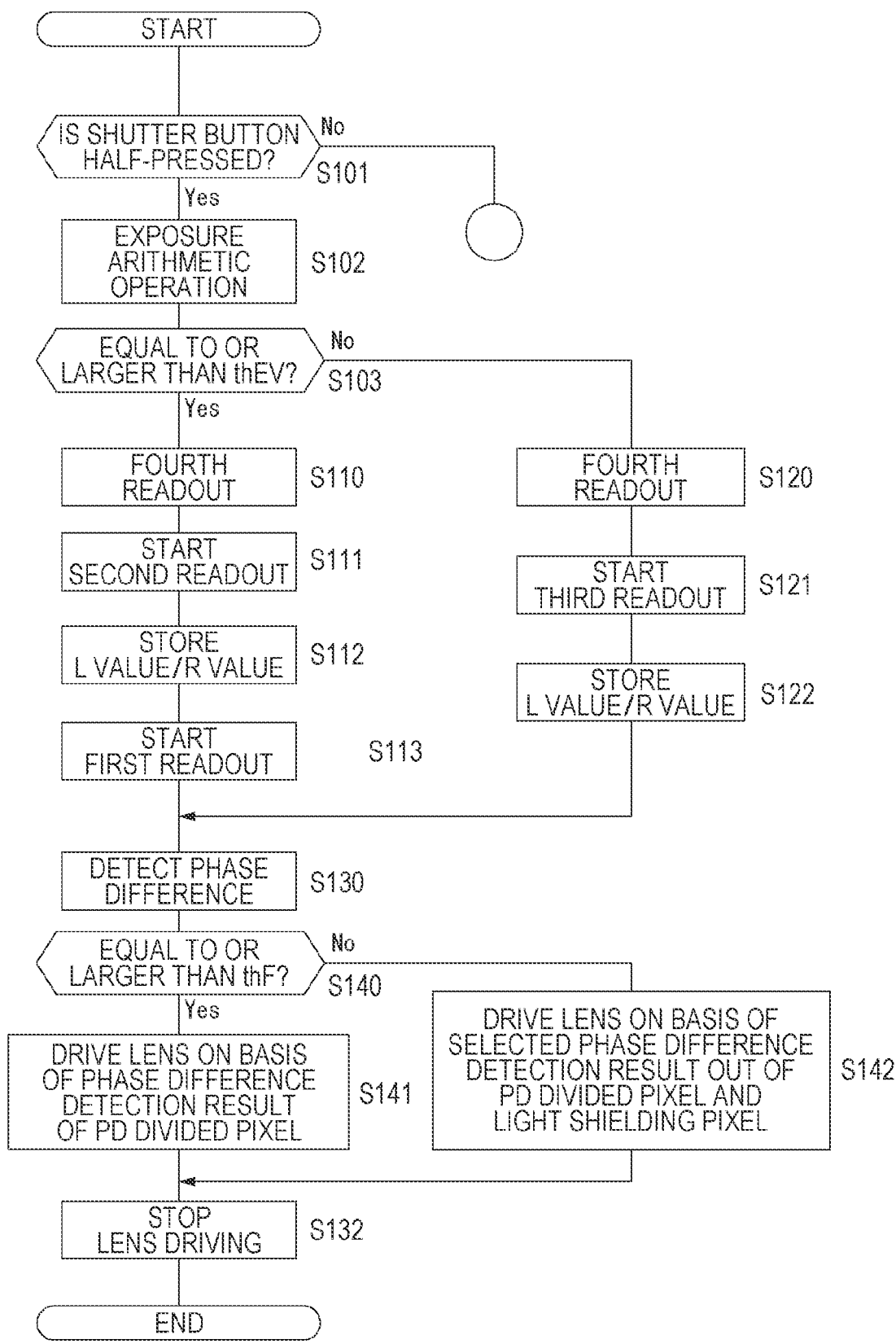
FIG. 18 is a flowchart of control of readout and an AF operation according to the second embodiment.

The above readout operations as in FIGS. 16, 17 are executed on the basis of control by the camera control unit 14. FIG. 18 illustrates an example of control processing by the camera control unit 14.

Steps S101, S102, and S103 in FIG. 18 are similar to those in FIG. 11, and redundant description is avoided.

In a case where it is determined that the EV is equal to or larger than the threshold thEV and it is a bright environment, the camera control unit 14 proceeds to step S110, and causes the fourth readout that is targeted at the light shielding pixels 23 to be started. The read out (L+R) value of the light shielding pixels 23 is stored in the camera signal processing unit 8.

Subsequent to the fourth readout, similar to FIG. 11, the camera control unit 14 causes the second readout, the R value calculation, and storing processing of the L value and the R value to be started as steps S111, S112, and thereafter, causes the first readout to be started in step S113.

Then, camera control unit 14 causes the first readout to be started, and causes the phase difference detection to be executed in step S130 without waiting for the end of the first readout.

In this case, both the phase difference detection based on the signals of the PD divided pixels 21 and the phase difference detection based on the signals of the light shielding pixels 23 are performed.

In a case where it is determined that the EV is not equal to or larger than the threshold thEV and it is a dark environment in step S103, the camera control unit 14 proceeds to step S120, and causes the fourth readout that is targeted at the light shielding pixels 23 to be started. The read out (L+R) value of the light shielding pixels 23 is stored in the camera signal processing unit 8.

Subsequent to the fourth readout, similar to FIG. 11, the camera control unit 14 causes the third readout, the R value calculation, and the storing processing of the L value and the R value to be started as steps S121, S122.

Then, when the operation started by the control in steps S121, S122 is continued and the third readout is completed, the camera control unit 14 proceeds to step S130, and causes the phase difference detection to be executed. Also in this case, both the phase difference detection based on the signals of the PD divided pixels 21 and the phase difference detection based on the signals of the light shielding pixels 23 are performed.

As described above, after proceeding to step S130 in a bright environment or a dark environment, in step S140, the camera control unit 14 determines that which phase difference detection result is highly reliable on the basis of the F value. For example, it is determined whether or not the F value is equal to or larger than a threshold thF. For example, an example in which the threshold thF=F 11 can be conceivable.

When the F value is equal to or larger than the threshold thF, the camera control unit 14 proceeds to step S141, and causes the defocus amount to be obtained by using the phase difference detection result from the PD divided pixel 21, and causes the lens driving to be executed as the AF control. Then, in step S132, the lens driving is stopped, and an in-focus state is obtained.

When the F value is less than the threshold thF, the camera control unit 14 proceeds to step S142, causes the defocus amount to be obtained by using the phase difference detection result with higher reliability out of the phase difference detection result from the PD divided pixels 21 and the phase difference detection result from the light shielding pixels 23, and causes the lens driving to be executed as the AF control, and causes an in-focus state to be obtained in step S132.

The light shielding pixel 23 and the PD divided pixel 21 have the following differences.

The light shielding pixel 23 is a pixel used only for phase difference detection. On the other hand, the PD divided pixel 21 can be used as a normal pixel (pixel for image generation) while being used for phase difference detection. Accordingly, the light shielding pixels 23 are discretely arranged, and the number of pixels cannot be much increased.

Therefore, the PD divided pixel 21 is superior to the light shielding pixel 23 in terms of low illuminance performance and large F value performance.

On the other hand, the light shielding pixel 23 is superior to the PD divided pixel 21 in terms of having pupil correction design flexibility and high off-axis performance.

In view of this, it is conceivable that the advantages of the PD divided pixel 21 can be utilized under a low illuminance environment, and the advantages of the light shielding pixel 23 can be utilized under a high illuminance environment.

Therefore, first, in step S140, the phase difference detection result of the PD divided pixel 21 that is advantageous in terms of the large F value performance is selected.

Furthermore, in step S142, it is conceivable to perform reliability determination on the basis of the illuminance environment. Specifically, one of phase difference signals is selected according to the exposure amount. In a dark environment, the phase difference detection result of the PD divided pixels 21 is selected, and in a bright environment, the phase difference detection result of the light shielding pixels 23 is selected.

Note that, in processing in FIG. 18, in step S130, the phase difference detection result based on the light shielding pixels 23 and the phase difference detection result based on the PD divided pixels 21 are calculated, and then one of the phase difference detection results is selected to be used for the AF control. However, selection may be performed first, and then selected phase difference detection may be executed thereafter.

<5. Summary and Modifications>

In the above embodiment, the following advantageous effects can be acquired.

The imaging apparatus 1 according to the embodiment includes an imaging element 7 including the PD divided pixels 21, and the camera control unit 14. The camera control unit 14 performs control to perform, with respect to the first readout in which the addition value (L+R) of the left PD 40L (first pixel) and the right PD 40R (second pixel) constituting the PD divided pixel 21 is read out as a pixel value constituting an image and the second readout of performing readout in which the L value and the R value used for phase difference detection can be obtained from the PD divided pixel 21 that is not a readout target in the first readout, the first readout after performing the second readout in one vertical period.

Performing the second readout prior to the first readout in one vertical period creates time to spare for the AF control based on the phase difference detection, and makes it possible to control the in-focus state in the next frame. In such a manner, it is possible to improve the responsiveness of the AF control.

Note that the readout in which the L value and the R value used for phase difference detection can be obtained may be the readout of the (L+R) value and the L value, or may be the readout of the (L+R) value and the R value. Alternatively, it may be readout of the L value and the R value.

In the first and second embodiments, an example has been described in which the camera control unit 14 performs the second readout and the first readout as readout in one vertical period in a case where it is determined as a bright environment by the bright/dark determination.

In a state where the frame rate is high, the length of one vertical period becomes shorter. This tends to cause the AF operation not to be in time for the next frame. In such a case, it is particularly effective not to lower the responsiveness of the AF operation by performing pre-readout as the second readout and performing the phase difference detection at an early stage.

Note that an example is conceivable in which the second readout and the first readout are performed irrespective of the bright/dark environment, and the third readout is not performed.

In the first and second embodiments, in a case where it is determined as a dark environment by the bright/dark determination, the camera control unit 14 performs control to perform the third readout in which, with respect to the pixel that is an image generation target, the pixel value constituting the live view image and the L value and the R value used for the phase difference detection can be obtained by reading out the (L+R) value that is an addition value of the left PD 40L and the right PD 40R and reading out the L value of the left PD 40L, as readout in one vertical period.

In a state where the frame rate is low, the length of the one vertical period becomes longer. Accordingly, the responsiveness of the AF operation does not matter too much even by the operation as the third readout. That is, in many cases, AF operation can be executed in time for the next frame. Therefore, in a dark environment, the third readout, which is simpler than performing the first readout and the second readout separately and in which power consumption can be suppressed, is performed.

Note that, in the third readout, for example, the (L+R) value may be read out, and the R value of the right PD 40R may also be read out.

In the first and second embodiments, an example has been given in which the (L+R) value and the L value are read out as vertical addition values of a plurality of PD divided pixels 21 in the vertical direction in the third readout.

In the low illuminance environment, the pixel value is obtained by adding and averaging a plurality of PD pixels in the vertical direction and is read out. Therefore, signal level to obtain the phase difference is increased so as not to deteriorate the S/N, and the AF operation is appropriately performed. That is, the low illuminance performance can be improved with respect to the AF operation using the PD divided pixels.

Furthermore, in the third readout, since the (L+R) value and the L value are read out from the same PD divided pixel 21, the number of the total lines to be read out can be reduced, so that the power consumption can be reduced. Note that this operation can shorten the overall readout time, and there may be a case where it also is advantageous for improving the frame rate.

In the first and second embodiments, an example has been given in which, in the first readout, addition values ((L+R) values) of the PD divided pixels in (N−1) or less horizontal lines are added in a vertical direction and read out in a cycle of N (for example, six) horizontal lines, and in the second readout, readout (for example, readout of the L value and the (L+R) value) is performed in which the L value and the R value can be obtained from the PD divided pixel 21 in the horizontal line for which readout is not performed in the first readout.

In the first readout, 4/6 (L+R) values in a cycle of six horizontal lines, for example, are vertically added and read out. Therefore, it is possible to obtain a pixel value with an appropriate signal level as a pixel value or the like used for live view.

Furthermore, in this case, the L value and the (L+R) value, for example, are read out from either one of the remaining two horizontal lines as the second readout. Since this readout is performed for the PD divided pixel 21 in the horizontal line that has not been read out in the first readout, it is sufficient if exposure for the first readout and the second readout is performed in common. That is, it is not necessary to separately set the exposure period for the first readout and the second readout, and an efficient operation can be realized as a readout operation in one vertical period.

Note that, in the embodiments, readout is periodically performed in units of six, but periodic readout in units of N is a positional example. It may not be periodic.

In the description according to the first embodiment, it has been mentioned that the value of N as a cycle of the horizontal lines may be changed according to the brightness.

Therefore, it is possible to generate a suitable image according to the lightness situation and to perform accurate phase difference detection. Furthermore, by changing the thinning-out rate according to the lightness, in a light situation, the number of pixels for which the first readout and the second readout are performed is reduced, and the readout time can be shortened.

In the first and second embodiments, in the second readout, readout of the addition value of the left PD 40L and the right PD 40R and readout of the value of the left PD 40L are performed.

For each one horizontal line, for example, readout is performed twice as readout of the left PD 40L and addition readout of the left PD 40L and the right PD 40R. As a result, the value of the left PD 40L and the value of the right PD 40R for defocus amount calculation can be obtained.

Note that, in the second readout, readout of the addition value of the left PD 40L and the right PD 40R and readout of the value of the right PD 40R may be performed.

Alternatively, in the second readout, for example, each of readout of the left PD 40L and readout of the right PD 40R may be performed.

In the first and second embodiments, the addition value obtained by the first readout is used for generating a live view image.

When the first readout and the second readout are performed for different PD divided pixels 21 as targets, the pixel value obtained by the first readout is not obtained as a pixel value of all valid PD divided pixel 21. Therefore, there may be a case where it becomes readout suitable for image generation with relatively low resolution. It is particularly suitable for generating a live view image. Furthermore, as a case where a user views the live view image, it is assumed when the user half-presses the shutter button 6S and is waiting for the release timing while checking the subject. That is, it is an opportunity in which the AF operation is performed. In such a case, it is useful to improve the AF operation responsiveness by performing the second readout prior to the first readout.

In the second embodiment, the imaging element 7 includes the light shielding pixels 23 that have a pupil division function by including: the light shielding unit that shields one beam of light of a pair of beams of light that has passed through a pair of partial regions, which are deviated in directions opposite to each other in a predetermined direction at the exit pupil; and the light receiving element that receives the other beam of light. The camera control unit 14 performs control to perform the fourth readout in which the light shielding pixels 23 are read out, and the phase difference detection processing is performed by using the values of the light shielding pixels 23 obtained by the fourth readout.

By using the imaging element 7 including the PD divided pixels 21 and the light shielding pixels 23, it becomes possible to perform the phase difference detection based on the PD divided pixels 21 and the phase difference detection based on the light shielding pixels 23, which can be selectively used according to a situation, for example.

In the second embodiment, the fourth readout is performed prior to the second readout as readout in one vertical period.

Whether the second readout or the fourth readout comes first or later is not necessarily limited, but by performing the fourth readout first, the AF control can be executed on the basis of the fourth readout in a situation in which, for example, reliability of the defocus amount based on the light shielding pixels is high, or the like, and the responsiveness can be improved.

In the second embodiment, it has been described that the focus control is performed by using the result with higher reliability out of the result of the phase difference detection processing based on the second readout and the result of the phase difference detection processing based on the fourth readout (see FIG. 18).

This enables the AF control that can obtain both advantages of the PD divided pixels and the light shielding pixels, and reliability of the AF can be improved.

The program according to the embodiment is a program that causes the CPU, the DSP, and the like, or a device including them, for example, to execute processing illustrated in FIGS. 11 and 18.

That is, the program according to the embodiment is a program that causes the arithmetic processing unit in the imaging apparatus 1 that includes the imaging element 7 including the PD divided pixels 21 to execute, with respect to the first readout in which an addition value of the first pixel and the second pixel constituting the PD divided pixel 21 is read out as a pixel value constituting an image and the second readout of performing readout in which the value of the first pixel and the value of the second pixel used for phase difference detection can be obtained from the PD divided pixel that is not a readout target in the first readout, processing in which the first readout is performed after performing the second readout in one vertical period. With such a program, the above described imaging apparatus 1 can be realized.

Such a program for realizing the imaging apparatus 1 can be recorded in advance in an HDD as a recording medium incorporated in a device such as the imaging apparatus 1, a ROM in a microcomputer including a CPU, or the like.

Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray Disc (registered trademark), a magnetic disk, a semiconductor memory, or a memory card. Such a removable recording medium can be provided as so-called package software.

Furthermore, such a program can be installed from a removable recording medium to a personal computer or the like, or can be downloaded from a download site via a network such as a local area network (LAN) or the Internet.

Furthermore, such a program is suitable for providing the imaging apparatus 1 according to the embodiment in a wide range. For example, by downloading the program to a mobile terminal device such as a smartphone or a tablet having a camera function, a mobile phone, a personal computer, a game device, a video device, a personal digital assistant (PDA), or the like, these devices can be caused to function as the imaging apparatus 1 of the present disclosure.

Note that the advantageous effects described in the present specification are merely examples and are not limited, and other advantageous effects may be provided.

The present technology can also adopt the following configurations.

(1)

An imaging apparatus including:

an imaging element including photodiode divided pixels; and a control unit that performs control to perform, with respect to first readout in which an addition value of a first pixel and a second pixel constituting the photodiode divided pixel is read out as a pixel value constituting an image and second readout of performing readout in which a value of the first pixel and a value of the second pixel used for phase difference detection can be obtained from the photodiode divided pixel that is not a readout target in the first readout, the first readout after performing the second readout in one vertical period.

(2)

The imaging apparatus according to (1) described above, in which the control unit performs the second readout and the first readout as readout in the one vertical period in a case where an environment is determined as a bright environment by bright/dark determination.

(3)

The imaging apparatus according to (2) described above, in which in a case where the environment is determined as a dark environment by the bright/dark determination, the control unit performs control to perform third readout in which, with respect to a pixel that is an image generation target, the pixel value constituting the image and the value of the first pixel and the value of the second pixel used for the phase difference detection can be obtained by reading out the addition value of the first pixel and the second pixel and reading out one value out of the first pixel and the second pixel, as readout in the one vertical period.

(4)

The imaging apparatus according to (3) described above, in which in the third readout, the one value out of the first pixel and the second pixel and the addition value are read out as addition values of values of a plurality of photodiode divided pixels in a vertical direction.

(5)

The imaging apparatus according to any one of (1) to (4) described above, in which in the first readout, addition values of the first pixels and the second pixels of the PD divided pixels in (N−1) or less horizontal lines are added in a vertical direction and read out in a cycle of N horizontal lines, N being a natural number of three or more, and in the second readout, readout is performed in which the value of the first pixel and the value of the second pixel can be obtained from the PD divided pixel in a horizontal line for which readout is not performed in the first readout.

(6)

The imaging apparatus according to (5) described above, in which a value of N as a cycle of the horizontal lines is changed according to brightness.

(7)

The imaging apparatus according to any one of (1) to (6) described above, in which in the second readout, readout of the addition value of the first pixel and the second pixel and readout of one value out of the first pixel and the second pixel are performed.

(8)

The imaging apparatus according to any one of (1) to (7) described above, in which the addition value obtained by the first readout is used for generating a live view image.

(9)

The imaging apparatus according to any one of (1) to (8) described above, in which the imaging element includes light shielding pixels that have a pupil division function by including: a light shielding unit that shields one beam of light of a pair of beams of light that has passed through a pair of partial regions, the partial regions being deviated in directions opposite to each other in a predetermined direction at an exit pupil; and a light receiving element that receives another beam of light, the control unit performs control to perform fourth readout in which the light shielding pixels are read out, and phase difference detection processing is performed by using values of the light shielding pixels obtained in the fourth readout.

(10)

The imaging apparatus according to (9) described above, in which the fourth readout is performed prior to the second readout as readout in the one vertical period.

(11)

The imaging apparatus according to (9) or (10) described above,
in which focus control is performed by using a result with higher reliability out of a result of the phase difference detection processing based on the second readout and a result of the phase difference detection processing based on the fourth readout.

(12)

An imaging method including,
as an imaging method of an imaging apparatus that includes an imaging element including photodiode divided pixels,
performing control to perform, with respect to first readout in which an addition value of a first pixel and a second pixel constituting the photodiode divided pixel is read out as a pixel value constituting an image and second readout of performing readout in which a value of the first pixel and a value of the second pixel used for phase difference detection can be obtained from the photodiode divided pixel that is not a readout target in the first readout, the first readout after performing the second readout in one vertical period.

REFERENCE SIGNS LIST

1 Imaging apparatus
2 Camera housing
3 Lens barrel
6S Shutter button
7 Imaging element
8 Camera signal processing unit
8a Phase difference detection unit
14 Camera control unit
21 PD divided pixel
22A First pixel row
22B Second pixel row
23, 23R, 23L Light shielding pixel
40L Left PD
40R Right PD

The invention claimed is:

1. An imaging apparatus comprising:
an imaging element including photodiode divided pixels; and
a control unit that performs control to perform, with respect to first readout in which an addition value of a first pixel and a second pixel constituting the photodiode divided pixel is read out as a pixel value constituting an image and second readout of performing readout in which a value of the first pixel and a value of the second pixel used for phase difference detection can be obtained from the photodiode divided pixel that is not a readout target in the first readout, the first readout after performing the second readout in one vertical period.

2. The imaging apparatus according to claim 1,
wherein the control unit performs the second readout and the first readout as readout in the one vertical period in a case where an environment is determined as a bright environment by bright/dark determination.

3. The imaging apparatus according to claim 2,
wherein in a case where the environment is determined as a dark environment by the bright/dark determination, the control unit performs control to perform third readout in which, with respect to a pixel that is an image generation target, the pixel value constituting the image and the value of the first pixel and the value of the second pixel used for the phase difference detection can be obtained by reading out the addition value of the first pixel and the second pixel and reading out one value out of the first pixel and the second pixel, as readout in the one vertical period.

4. The imaging apparatus according to claim 3,
wherein in the third readout, the one value out of the first pixel and the second pixel and the addition value are read out as addition values of values of a plurality of photodiode divided pixels in a vertical direction.

5. The imaging apparatus according to claim 1,
wherein in the first readout, addition values of the first pixels and the second pixels of the PD divided pixels in (N−1) or less horizontal lines are added in a vertical direction and read out in a cycle of N horizontal lines, N being a natural number of three or more, and
in the second readout, readout is performed in which the value of the first pixel and the value of the second pixel can be obtained from the PD divided pixel in a horizontal line for which readout is not performed in the first readout.

6. The imaging apparatus according to claim 5,
wherein a value of N as a cycle of the horizontal lines is changed according to brightness.

7. The imaging apparatus according to claim 1,
wherein in the second readout, readout of the addition value of the first pixel and the second pixel and readout of one value out of the first pixel and the second pixel are performed.

8. The imaging apparatus according to claim 1,
wherein the addition value obtained by the first readout is used for generating a live view image.

9. The imaging apparatus according to claim 1,
wherein the imaging element includes
light shielding pixels that have a pupil division function by including: a light shielding unit that shields one beam of light of a pair of beams of light that has passed through a pair of partial regions, the partial regions being deviated in directions opposite to each other in a predetermined direction at an exit pupil; and a light receiving element that receives another beam of light,
the control unit performs control to perform fourth readout in which the light shielding pixels are read out, and phase difference detection processing is performed by using values of the light shielding pixels obtained in the fourth readout.

10. The imaging apparatus according to claim 9,
wherein the fourth readout is performed prior to the second readout as readout in the one vertical period.

11. The imaging apparatus according to claim 9,
wherein focus control is performed by using a result with higher reliability out of a result of the phase difference detection processing based on the second readout and a result of the phase difference detection processing based on the fourth readout.

12. An imaging method comprising,
as an imaging method of an imaging apparatus that includes an imaging element including photodiode divided pixels, performing control to perform, with respect to first readout in which an addition value of a first pixel and a second pixel constituting the photodiode divided pixel is read out as a pixel value constituting an image and second readout of performing readout in which a value of the first pixel and a value of the second pixel used for phase difference detection can be obtained from the photodiode divided pixel that is not a readout target in the first readout, the first readout after performing the second readout in one vertical period.

* * * * *